United States Patent
Aoyama

(10) Patent No.: US 9,258,540 B2
(45) Date of Patent: Feb. 9, 2016

(54) IMAGING APPARATUS

(71) Applicant: CANON KABUSHIKI KAISHA, Tokyo (JP)

(72) Inventor: Yuuzou Aoyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 34 days.

(21) Appl. No.: 14/104,111

(22) Filed: Dec. 12, 2013

(65) Prior Publication Data

US 2014/0178053 A1 Jun. 26, 2014

(30) Foreign Application Priority Data

Dec. 25, 2012 (JP) ................................. 2012-281751

(51) Int. Cl.
| | |
|---|---|
| *H04N 5/76* | (2006.01) |
| *H04N 9/79* | (2006.01) |
| *H04N 5/77* | (2006.01) |
| H04N 9/804 | (2006.01) |
| H04N 5/232 | (2006.01) |

(52) U.S. Cl.
CPC ................. *H04N 9/79* (2013.01); *H04N 5/772* (2013.01); *H04N 5/23241* (2013.01); *H04N 9/8042* (2013.01)

(58) Field of Classification Search
CPC ................................ H04N 9/79; H04N 5/772
USPC ............. 348/14.01, 14.03, 43, 395.5, 207.99, 348/231.6; 386/210, 224
See application file for complete search history.

(56) References Cited

U.S. PATENT DOCUMENTS

| | | | |
|---|---|---|---|
| 2004/0109679 A1 | 6/2004 | Watanabe et al. | |
| 2004/0189819 A1 | 9/2004 | Saito | |
| 2007/0140255 A1* | 6/2007 | Gautier et al. | 370/395.5 |
| 2012/0219053 A1* | 8/2012 | Snow et al. | 375/240.02 |
| 2012/0275515 A1* | 11/2012 | Aoki et al. | 375/240.12 |
| 2013/0093834 A1* | 4/2013 | Ho | 348/14.03 |
| 2013/0208089 A1* | 8/2013 | Akagi et al. | 348/43 |

FOREIGN PATENT DOCUMENTS

| | | |
|---|---|---|
| EP | 2053841 A1 | 4/2009 |
| JP | 2005-101835 A | 4/2005 |

OTHER PUBLICATIONS

The above patent documents were cited in the Search Report issued on Jun. 6, 2014, that issued in the corresponding European Patent Application No. 13199398.2.

* cited by examiner

*Primary Examiner* — Thai Tran
*Assistant Examiner* — Mishawn Hunter
(74) *Attorney, Agent, or Firm* — Cowan, Liebowitz & Latman, P.C.

(57) ABSTRACT

This invention allows recording of moving images with a large number of pixels and high frame rate while suppressing the circuit scale and power consumption. A first processing circuit encodes a frame acquired from an image capturing device, records the resultant encoded data in a recording medium at a recording position received from a second processing circuit, and transmits a relevant data amount to the second processing circuit. The second processing circuit encodes a frame obtained from the image capturing device, records the resultant encoded data in the recording medium at a recording position determined in prior recording processing, determines a recording position for the first processing circuit, and transmits the determined recording position to the first processing circuit. Upon receiving information showing a data amount, the second processing circuit updates a recording position based on the received data amount.

13 Claims, 19 Drawing Sheets

FIG. 7A

| START ADDRESS | END ADDRESS |
|---|---|
| 0x000000 | 0x010000 |
| 0x018000 | 0x020000 |
| 0x050000 | 0x080000 |
| . . . | . . . |

FIG. 7B

| START ADDRESS | END ADDRESS |
|---|---|
| 0x001D00 | 0x010000 |
| 0x018000 | 0x020000 |
| 0x050000 | 0x080000 |
| . . . | . . . |

FIG. 7C

| START ADDRESS | END ADDRESS |
|---|---|
| 0x03A000 | 0x010000 |
| 0x018000 | 0x020000 |
| 0x050000 | 0x080000 |
| . . . | . . . |

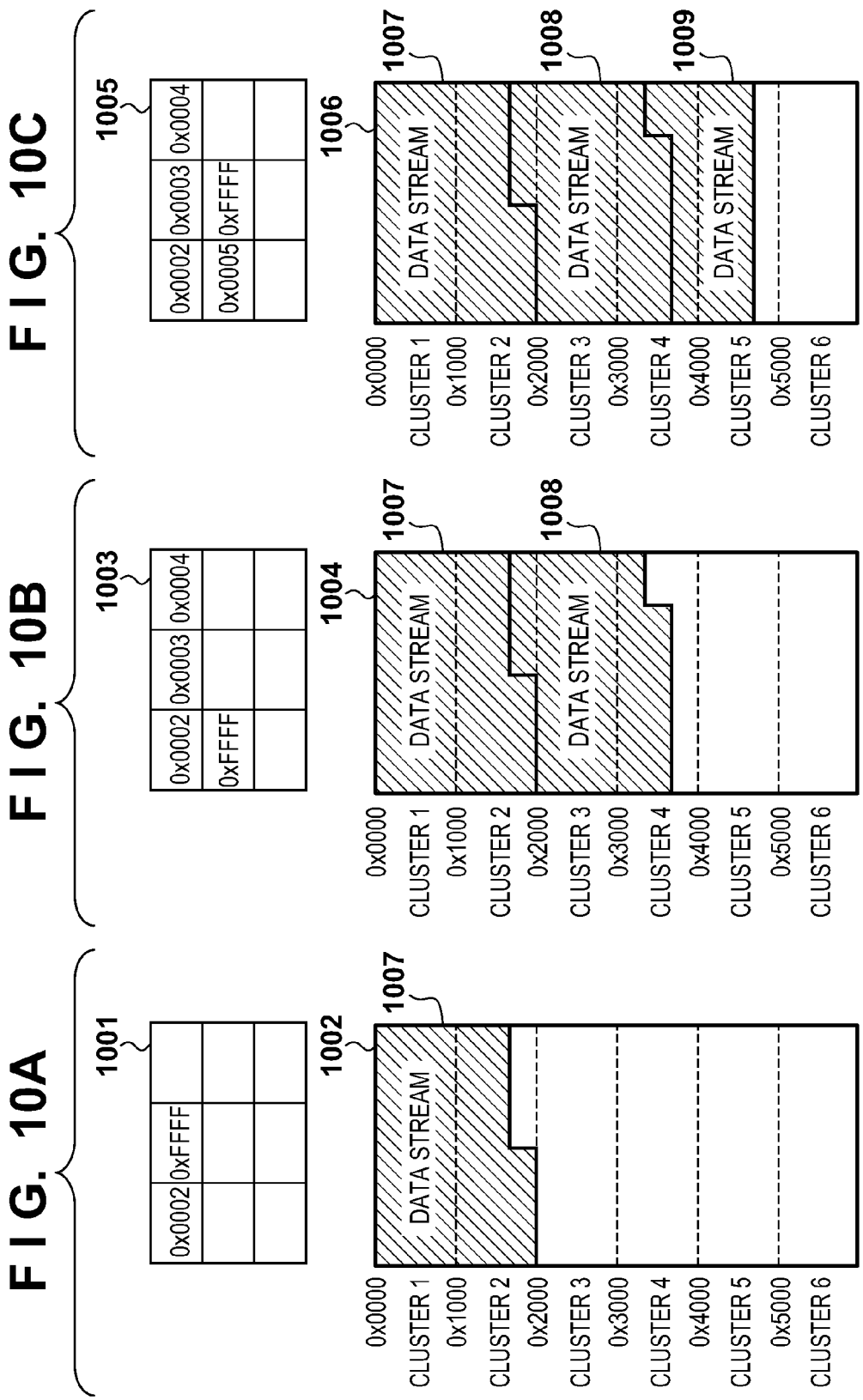

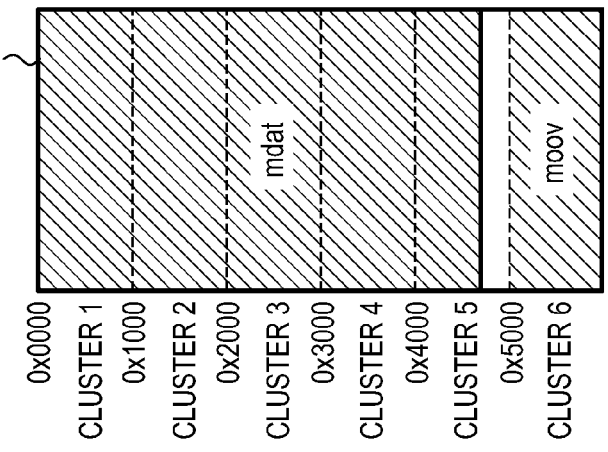
FIG. 10D
FIG. 10E
FIG. 10F
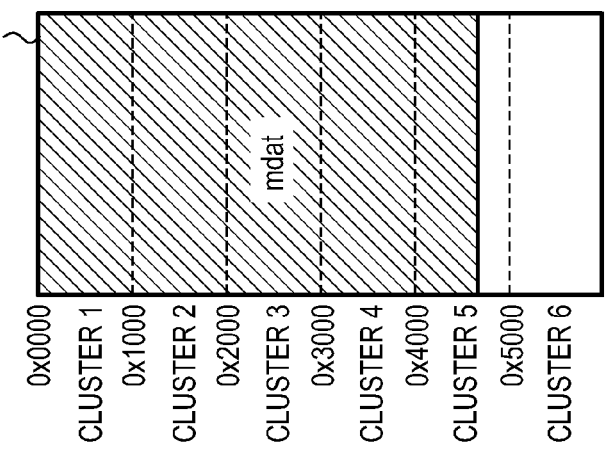

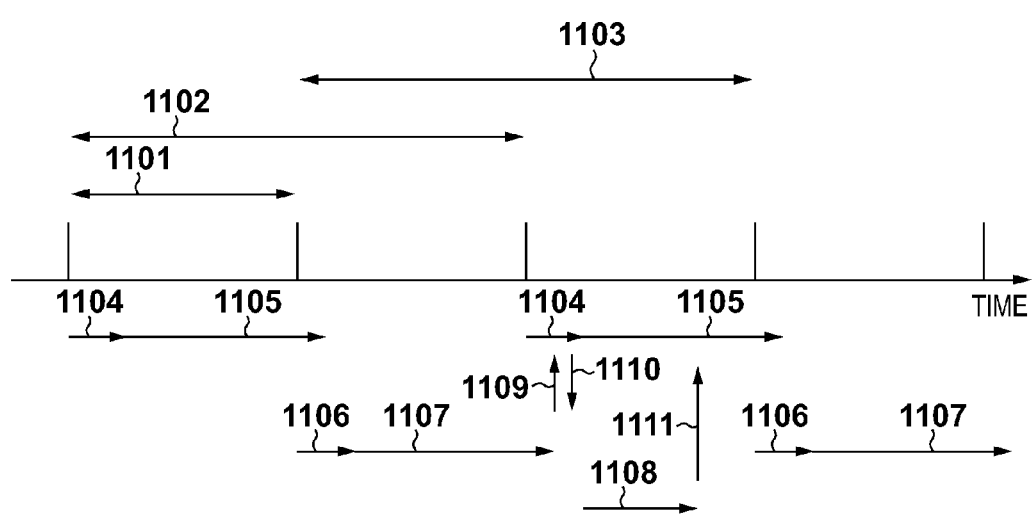
F I G. 11

F I G. 14
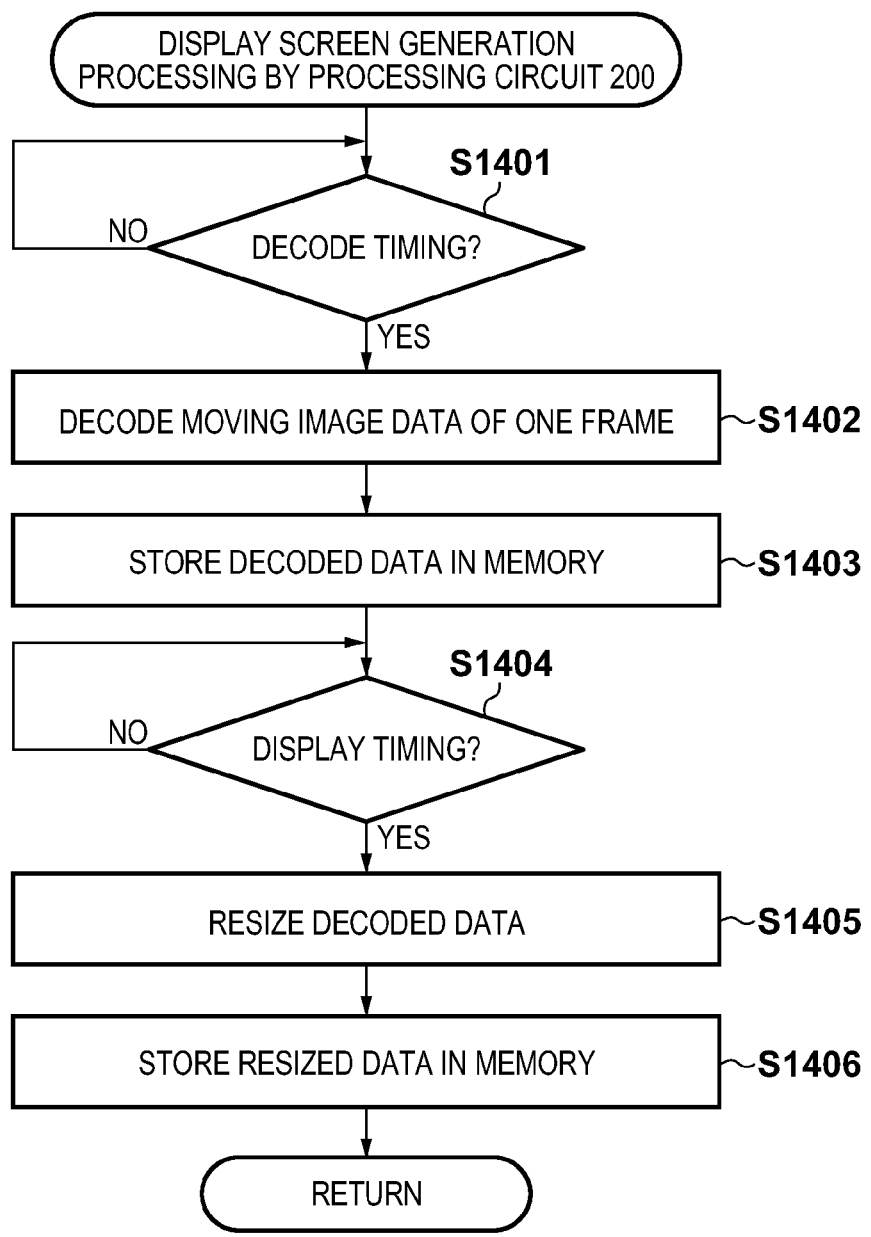

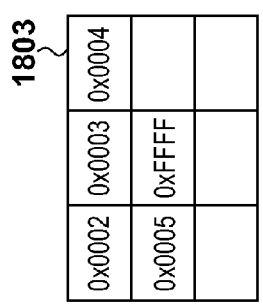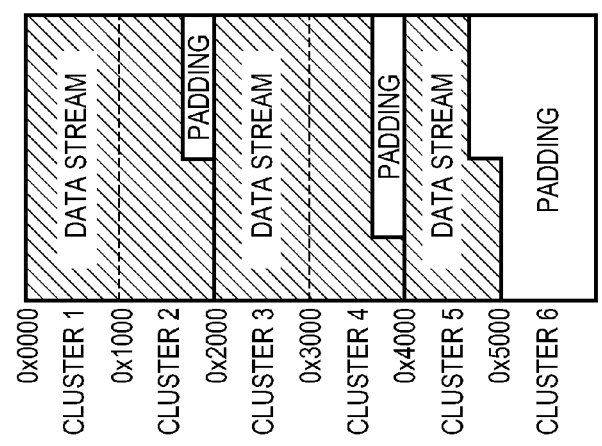
FIG. 18C
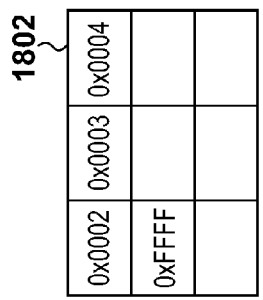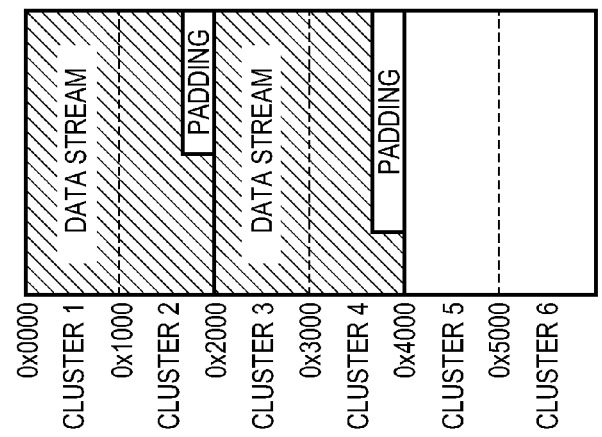
FIG. 18B
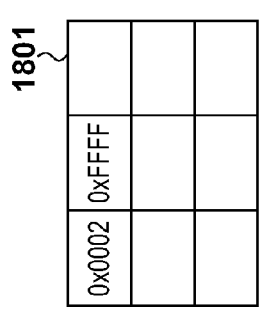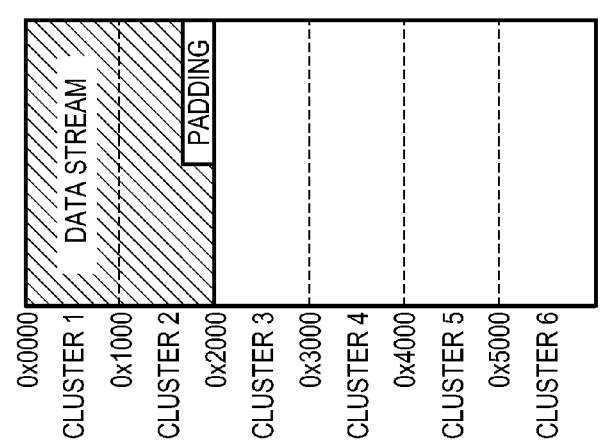
FIG. 18A

IMAGING APPARATUS

BACKGROUND OF THE INVENTION

1. Field of the Invention

The present invention relates to an imaging apparatus that captures moving images.

2. Description of the Related Art

Conventionally, digital cameras and other imaging apparatuses are known that capture moving images and record the captured moving images in a recording medium such as a memory card (for example, Japanese Patent Laid-Open No. 2005-101835). In recent years, some consumer digital cameras can capture moving images with a large number of pixels. Furthermore, a frame rate of captured moving images (the number of frames per unit time) is increasing.

With an increase in the number of pixels and the frame rate of captured moving images, a data amount to be processed per unit time increases; this makes it necessary to process moving image data at a speed faster than ever.

Improvements in the processing ability for moving image data require a memory that has a large storage capacity and can be accessed at high speed, and a processing circuit that can process moving image data at a higher speed, such as a microcomputer.

However, the use of these high-performance memory and microcomputer leads to an increase in the circuit scale and the power consumption. Especially, with regard to consumer digital cameras, there is demand for a reduction in size and cost as well as maximum suppression of the power consumption, and therefore a high-performance memory and microcomputer cannot be used in some cases. This gives rise to the problem that moving images with a large number of pixels and a high frame rate cannot be captured.

SUMMARY OF THE INVENTION

The present invention in a first aspect provides an imaging apparatus comprising: an imaging unit; a first processing circuit including a first CPU and a first communication unit, the first processing circuit acquiring moving image data from the imaging unit and recording the acquired moving image data in a recording medium; and a second processing circuit including a second CPU and a second communication unit, the second processing circuit acquiring, from the imaging unit, moving image data of a frame that is different from a frame acquired by the first processing circuit, and recording the acquired moving image data in the recording medium, wherein the second processing circuit determines a recording position in the recording medium at which the first processing circuit is to record moving image data, and causes the second communication unit to transmit information of the recording position to the first processing circuit, wherein the first processing circuit records moving image data in the recording medium in accordance with the information of the recording position transmitted from the second processing circuit.

According to embodiments of the present invention, moving images with a large number of pixels and a high frame rate can be recorded while suppressing the circuit scale and the power consumption.

Further features of the present invention will become apparent from the following description of exemplary embodiments (with reference to the attached drawings).

BRIEF DESCRIPTION OF THE DRAWINGS

FIGS. 7A to 7C show a list of free space in a recording medium.

FIGS. 10A to 10F show data and management information recorded in the recording medium.

FIG. 11 shows timings of processing executed by the processing circuits 100 and 200 at the time of recording moving image data.

FIG. 14 is a flowchart of decoding processing for moving image data executed by the processing circuit 200.

FIGS. 18A to 18C show data and management information recorded in the recording medium.

DESCRIPTION OF THE EMBODIMENTS

Figure 1:
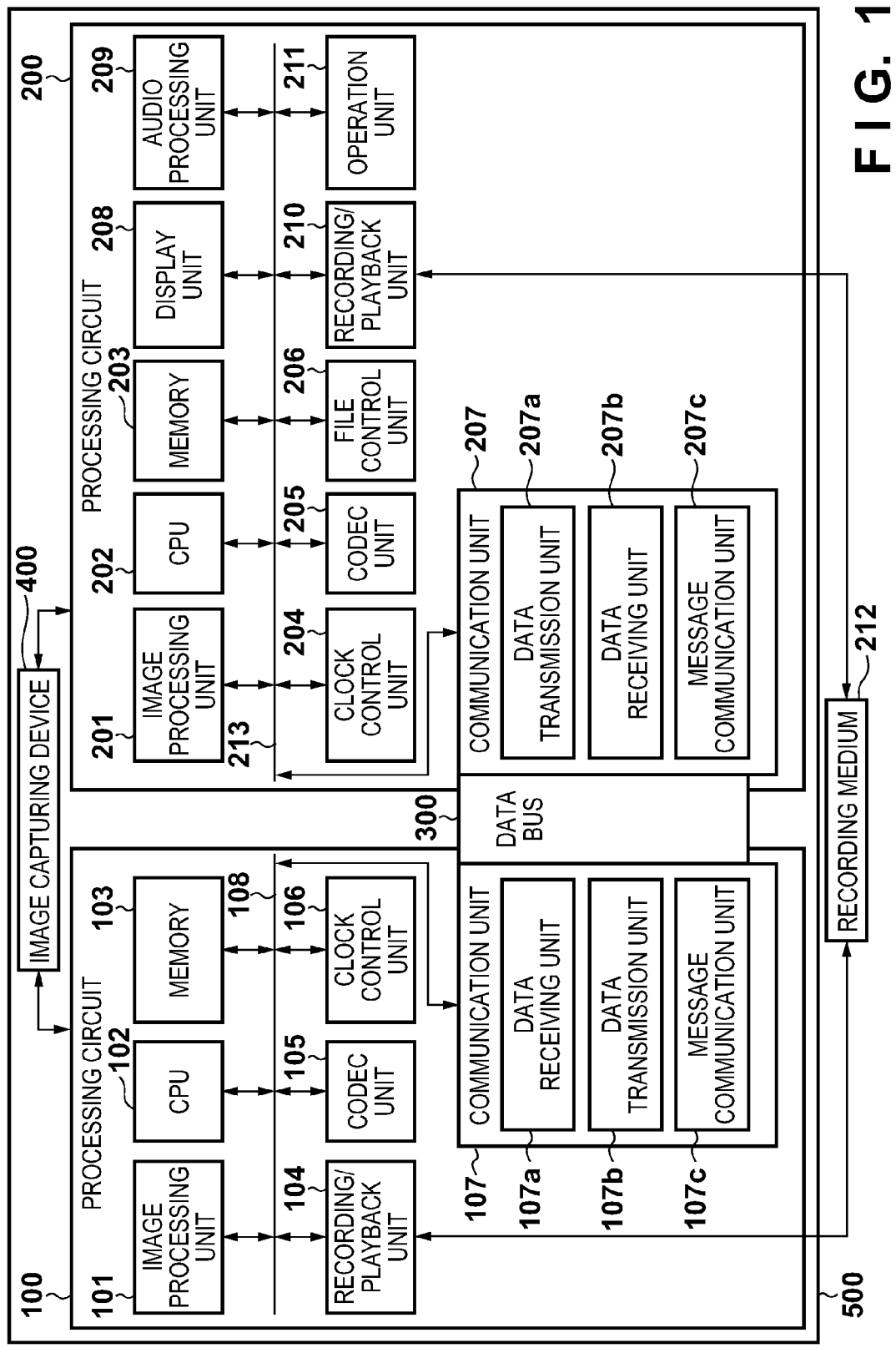
FIG. 1 is a block diagram showing a configuration of an imaging apparatus according to an embodiment.

An embodiment of the present invention will be described below in detail with reference to the attached drawings. FIG. 1 is a block diagram showing an example of a configuration of an imaging apparatus 500 according to the present embodiment.

The imaging apparatus 500 includes two processing circuits, that is to say, a processing circuit 100 (first processing circuit) and a processing circuit 200 (second processing circuit). In the present embodiment, these two processing circuits 100 and 200 are each configured as a single integrated circuit (IC).

Furthermore, a dedicated bus 300 is provided, via which the two processing circuits 100 and 200 communicate with each other. Each of the processing circuits 100 and 200 can independently acquire moving image data from an image capturing device 400. Each of the processing circuits 100 and 200 can also process moving image data acquired from the image capturing device 400.

A description is now given of configurations of the processing circuits 100 and 200. The processing circuit 100 includes an image processing unit 101, a first CPU (central processing unit) 102, a memory 103, a recording/playback unit 104, a codec unit 105, a clock control unit 106, a communication unit 107, and a bus 108. In the present embodiment, an SDRAM is used as the memory 103. Although the memory 103 described herein is built in the processing circuit 100, it may instead be provided outside the processing circuit 100.

The CPU 102 controls the operations of the imaging apparatus 500 in accordance with a computer program (software) stored in the memory 103. The memory 103 also functions as a working area for the CPU 102. It should be noted that a working area for the CPU 102 is not limited to the memory 103, and may be, for example, an external recording apparatus such as a hard disk drive. The image processing unit 101 applies image processing, such as pixel interpolation processing and color conversion processing, to moving image data acquired from the image capturing device 400. The image processing unit 101 converts moving image data of an RGB color space acquired from the image capturing device 400 into a data format of a YUV color space. The image processing unit 101 also reduces or increases (resizes) the number of pixels in (a screen size for) moving images acquired by the image capturing device 400 and moving images played back.

The CPU 102 controls the image capturing device 400 and the image processing unit 101 to execute autofocus (AF) processing and automatic exposure control (AE) processing. When the CPU 102 has issued an instruction to start the AF processing and the AE processing, the image processing unit 101 executes calculation processing using moving image data acquired from the image capturing device 400. Based on the result of this calculation, the image capturing device 400 and the image processing unit 101 execute the AF processing and the AE processing using a TTL (through-the-lens) method.

When a user has issued an instruction to capture and record moving images, the CPU 102 causes the image capturing device 400 and the image processing unit 101 to execute image capture processing including exposure processing, development processing, and the like. The image capturing device 400 includes, for example, an image sensor such as a CCD and a CMOS, and an AD converter. The image capturing device 400 converts an analog signal acquired from the image sensor into digital data, and outputs the digital data. Moving image data acquired from the image capturing device 400 is stored in the memory 103 as picture data of a YUV format. The codec unit 105 applies encoding processing to moving image data stored in the memory 103; as a result, a data amount of the moving image data is compressed.

At the time of recording, the recording/playback unit 104 writes encoded moving image data to a recording medium 212. At the time of playback, moving image data is read from the recording medium 212. At the time of image capture, the codec unit 105 encodes moving image data acquired from the image capturing device 400 using a known encoding method, such as H.264 (MPEG-4 AVC). At the time of playback, the codec unit 105 decodes moving image data read from the recording medium 212 as will be described later. The clock control unit 106 generates various types of operational clocks for controlling the timings of processing executed by the processing circuit 100. A timing signal from the clock control unit 106 is used to control, for example, a timing for acquiring moving image data from the image capturing device 400 at the time of capturing moving images.

The communication unit 107 transmits and receives moving image data and other necessary commands (instruction information) to and from the processing circuit 200. The communication unit 107 includes a data receiving unit 107a for receiving moving image data, a data transmission unit 107b for transmitting moving image data, and a message communication unit 107c for transmitting a message such as a control command. The communication unit 107 performs communication via the dedicated bus 300. Each unit of communication can be performed independently.

In the present embodiment, moving image data processed by the processing circuit 100 is transmitted from the communication unit 107 to the processing circuit 200 at the time of playback as will be described later.

The processing circuit 200 includes an image processing unit 201, a second CPU 202, a memory 203, a clock control unit 204, a codec unit 205, a file management unit 206, a communication unit 207, a display unit 208, an audio processing unit 209, a recording/playback unit 210, an operation unit 211, and a bus 213. In the present embodiment, an SDRAM is used as the memory 203. Although the memory 203 is built in the processing circuit 200, the memory 203 may instead be provided outside the processing circuit 200. Blocks represented by the image processing unit 201, the second CPU 202, the memory 203, the clock control unit 204, the codec unit 205, and the communication unit 207 have functions similar to the functions of corresponding blocks in the processing circuit 100.

At the time of image capture, the processing circuit 200 acquires moving image data from the image capturing device 400 and executes encoding processing using the codec unit 205. At the time of recording, the recording/playback unit 210 records the following in the recording medium 212: moving image data encoded by the codec unit 205; moving image data transmitted from the processing circuit 100; and audio data generated by the audio processing unit 209. The recording medium 212 is a random-access medium such as a memory card. In the present embodiment, the recording medium 212 can easily be attached/removed via an attachment/removal mechanism, which is not shown in the drawings. Alternatively, the recording medium 212 may be built in the imaging apparatus 500.

The CPU 202 controls the recording of moving image data and audio data in accordance with a frame rate of moving images designated by the operation unit 211, and with a mute/unmute setting made by the user.

At the time of playback, the recording/playback unit 210 reads, from the recording medium 212, moving image data and audio data of a scene selected by the user as will be described later. At the time of playback, the codec unit 205 decodes moving image data and audio data read from the recording medium 212.

At the time of image capture, the image processing unit 201 changes the image size of moving image data acquired from the image capturing device 400 to match the size of the display unit 208, and stores the moving image data in the memory 203. Then, the resized data is supplied to and displayed on the display unit 208. At the time of playback, the image processing unit 201 changes the size of moving image data that has been played back to match the size of the display unit 208, and stores the moving image data in the memory 203. Then, the resized data is supplied to and displayed on the display unit 208.

Audio data that has been played back is supplied to and output from the audio processing unit 209. The display unit 208 is constituted by a display device such as a liquid crystal display. The display unit 208 displays not only moving images that have been captured and moving images that have been played back, but also various types of other information. The CPU 202 generates information to be displayed on the display unit 208, and transmits the generated information to the display unit 208.

The file control unit 206 manages moving images and audio recorded in the recording medium 212 as files in accordance with a predetermined file system. In the present embodiment, moving image files recorded in the recording medium 212 are managed in accordance with the FAT file system. Note that the file control unit 206 is provided in the processing circuit 200 in the present embodiment. When the power is turned on, or when the recording medium is attached, the file control unit 206 reads management information (e.g., file allocation table (FAT) and directory entries) related to the file system from the recording medium 212, and stores the read management information in the memory 203. At the time of recording processing with respect to the recording medium 212, management information stored in the memory 203 is changed (updated). Management information in the recording medium 212 is updated by reading the updated management information from the memory 203 and recording the read management information in the recording medium 212 through the recording/playback unit 210 at a predetermined timing, such as when the recording of moving images is stopped.

The operation unit 211 functions as a user interface for operating the imaging apparatus 500. The operation unit 211 includes a power button, a mode changing button, a shutter button, arrow buttons, a menu button, and the like for operating the imaging apparatus 500, and each button is constituted by a switch, a touchscreen, or the like. The CPU 202 controls the imaging apparatus 500 in accordance with a user instruction input via the operation unit 211. When any of the buttons included in the operation unit 211 is operated by the user, the operation unit 211 inputs an operation signal corresponding to that button to the CPU 202. The CPU 202 analyzes the operation signal input from the operation unit 211, and determines processing corresponding to the operation signal in accordance with the result of the analysis. The CPU 202 controls the components of the imaging apparatus 500 to execute processing corresponding to the operation signal input from the operation unit 211.

Next, a description is given of a format of moving image data recorded by the imaging apparatus 500. In the present embodiment, captured moving image data and audio data are recorded in the recording medium 212 as moving image files. Also, in the present embodiment, moving image files are recorded in accordance with an MOV format, which is a commonly-used file format.

Figure 2:
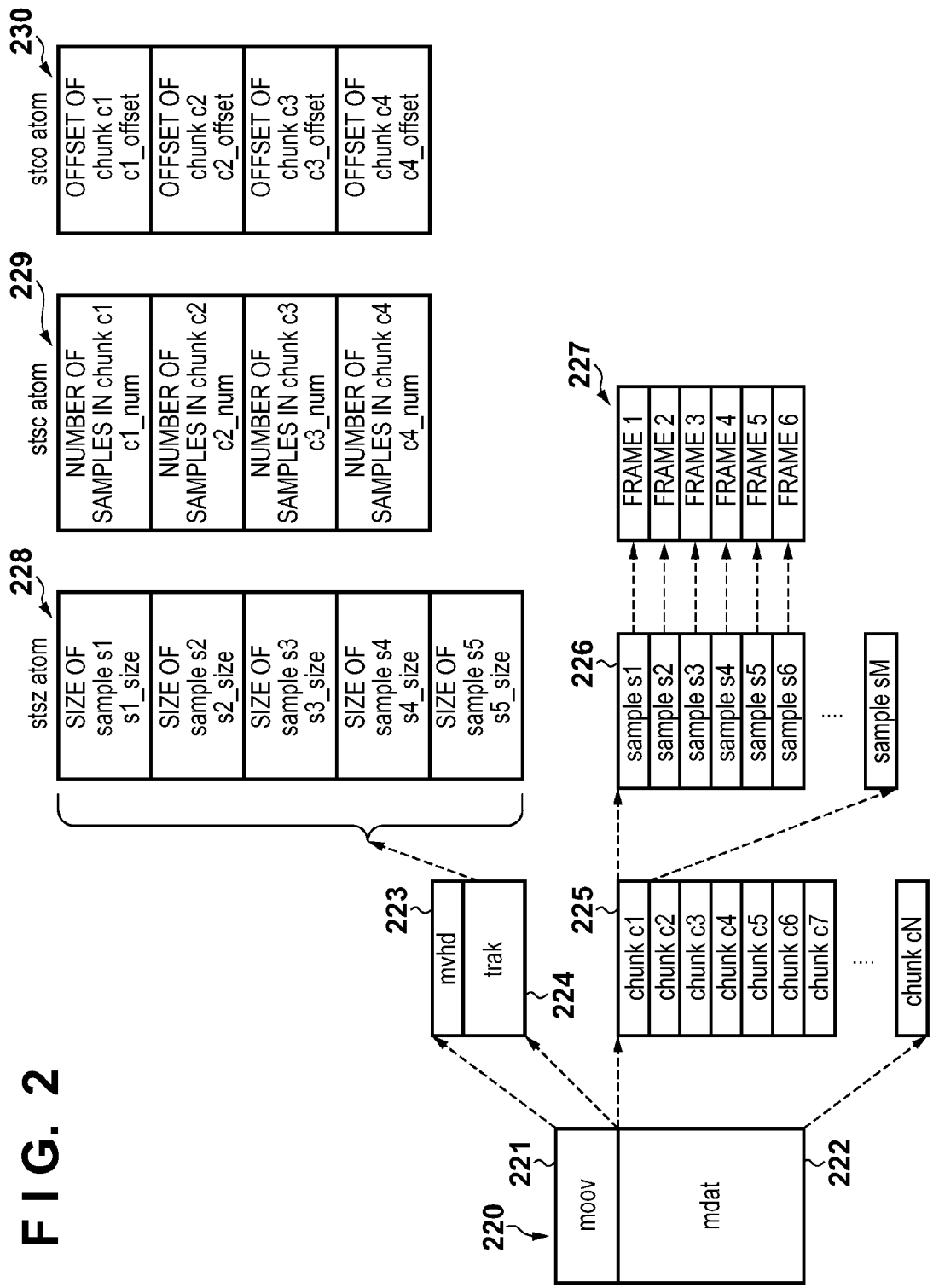
FIG. 2 shows a structure of a recorded moving image file.

A MOV file is made up of a number of data blocks called atoms (or boxes). FIG. 2 shows a file format of an MOV file. As indicated by 220 in FIG. 2, an MOV file includes an mdat atom 222, which stores a data stream made up of encoded moving image data and audio data, and an moov atom 221, which stores management information related to the data stream. The mdat atom 222 is made up of a plurality of chunks (chunk cN) as indicated by reference sign 225. As indicated by reference sign 226, each chunk is made up of a plurality of samples (sample sN). Each sample corresponds to, for example, one of frames in encoded moving image data.

The moov atom 221 is made up of an mvhd atom 223, which is header information in which the date and time of generation, etc. are recorded, and a track atom 224, in which management information is stored. The trak atom 224 stores an stsz atom 228, which stores information of sizes of samples. The trak atom 224 also stores an stsc atom 229, which stores information of the number of samples in each chunk. The trak atom 224 further stores an stco atom 230, which stores information of an offset value (the number of bytes) from the head of the file to each chunk in the mdat atom 222.

A data amount of data stored in the stsz atom 228, the stsc atom 229 and the stco atom 230 increases as the amount of recorded moving image data and audio data, i.e. the duration of the recording, increases. For example, in the case where images composed of 30 frames per second are stored such that each chunk includes 15 frames, two-hour data has a size of approximately 1 megabyte. Contents of the management information stored in the moov atom 221 are not fixed until the recording is completed. Furthermore, as the size of the moov atom 221 increases in accordance with the duration of the recording, the size of the moov atom 221 is not fixed until the recording is completed. For this reason, the mdat atom 222 is arranged at the head of the file; upon completion of the recording, the moov atom 221 is arranged at a position that the mdat atom 222 then follows.

At the time of playback of a moving image file in the MOV format, the moov atom 221 is read first, and each chunk can be accessed using the management information stored in the moov atom 221. In view of this, it is preferable to perform the recording with a structure in which the moov atom 221 can easily be accessed by arranging the moov atom 221 at the head of the file, rather than arranging the moov atom 221 posterior to the mdat atom 222.

Next, a description is given of processing executed by the imaging apparatus 500 at the time of recording.

First, frames processed by the processing circuits 100 and 200 will be described. As described earlier, in the present embodiment, moving image data is encoded in accordance with the H.264 method. According to H.264, the following three encoding methods are used: intra-frame predictive encoding; forward inter-frame predictive encoding; and bidirectional inter-frame predictive encoding. While H.264 enables selection of these encoding methods in units of slices, the present embodiment incorporates a configuration in which one frame is regarded as one slice and an encoding method is selected on a per-frame basis. A frame encoded using the intra-frame predictive encoding is referred to as an I-frame, a frame encoded using the forward inter-frame predictive encoding is referred to as a P-frame, and a frame encoded using the bidirectional inter-frame predictive encoding is referred to as a B-frame.

In the present embodiment, two sets of moving image data respectively encoded by the processing circuits 100 and 200 are recorded in the recording medium 212 as one set of moving image data. Therefore, in the present embodiment, the processing circuits 100 and 200 encode frames in moving image data using the intra-frame predictive encoding. This eliminates the need to transmit and receive information of reference frames between the processing circuits 100 and 200 at the time of encoding. It should be noted, however, that not only the intra-frame prediction but also the inter-frame predictive encoding may be used in other embodiments. In this case, it is necessary to transmit and receive information of reference frames for the inter-frame prediction between the processing circuits 100 and 200.

Figure 12:
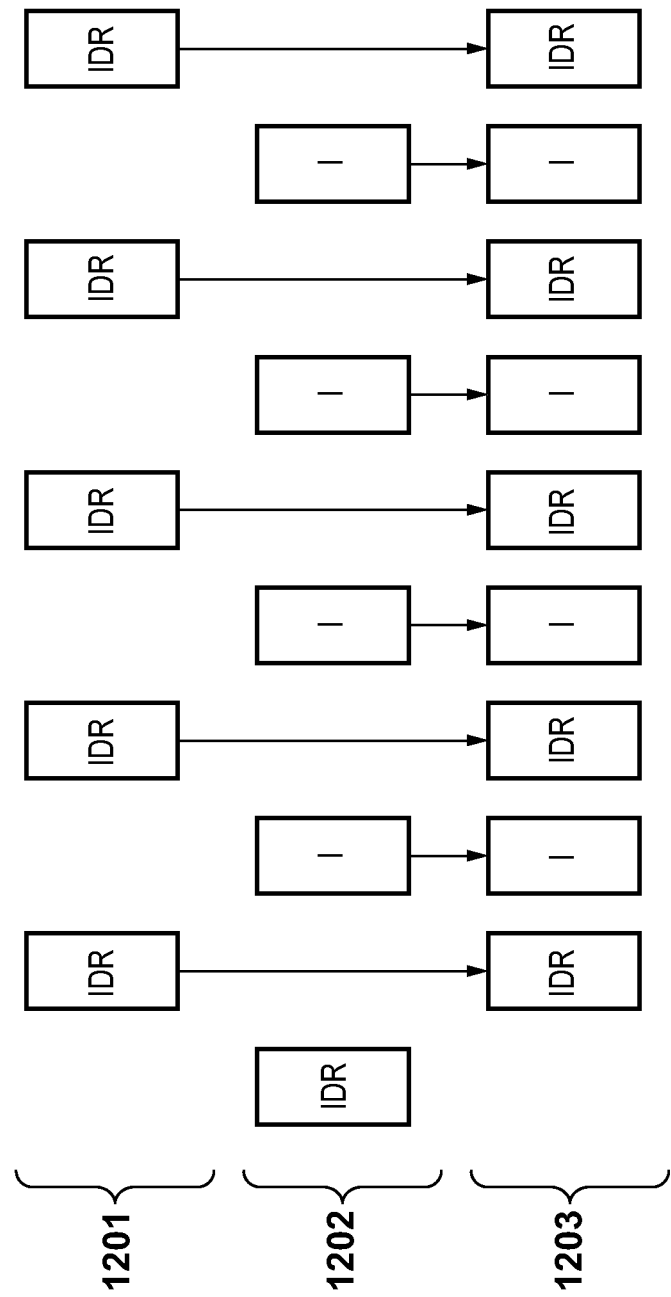
FIG. 12 shows an encoding method for moving image data targeted for encoding.

In FIG. 12, reference sign 1201 indicates moving image data generated by the processing circuit 200, reference sign 1202 indicates moving image data generated by the processing circuit 100, and reference sign 1203 indicates moving image data recorded in the recording medium 212. As shown in this figure, the processing circuits 100 and 200 alternately acquire moving image data of every other frame generated by the image capturing device 400, and apply encoding processing thereto. That is to say, the processing circuit 200 processes moving image data of frames different from frames processed by the processing circuit 100.

Therefore, the burden on each of the processing circuits 100 and 200 is approximately half of the burden of encoding processing at a frame rate for encoding. Stated another way, the present embodiment allows recording of moving images of a frame rate or resolution that is equivalent to double the burden on the processing circuits 100 and 200.

Furthermore, the processing circuit 200 encodes frames of moving image data as IDR (instantaneous decoding refresh)-I frames. The H.264 encoding allows execution of inter-frame predictive encoding that skips I-frames. In contrast, inter-frame prediction that skips IDR-I frames is prohibited. On the other hand, the processing circuit 100 encodes the first frame that follows an instruction to start the recording as an IDR-I frame, and encodes the second and subsequent frames as normal I-frames. It is necessary to add an ID called idr_pic_id to each IDR-I frame. Also, according to H.264, idr_pic_id of the same value cannot be added to neighboring IDR-I frames. For example, if the processing circuits 100 and 200 encode all frames as IDR-I frames starting from the first frame and add idr_pic_id of the same values thereto, then the resultant frames, when combined, may include neighboring IDR-I frames with the same idr_pic_id value.

Data of idr_pic_id is Golomb-encoded and is described with an undefined length. It is hence difficult to change the idr_pic_id values after combining moving image data generated by the processing circuits 100 and 200. In view of the above, with regard to moving image data generated by the processing circuit 100 in the present embodiment, the second and subsequent frames are encoded as I-frames, and the first IDR-I frame is not recorded as will be described later; in this way, there is no need to change idr_pic_id.

Figure 3:
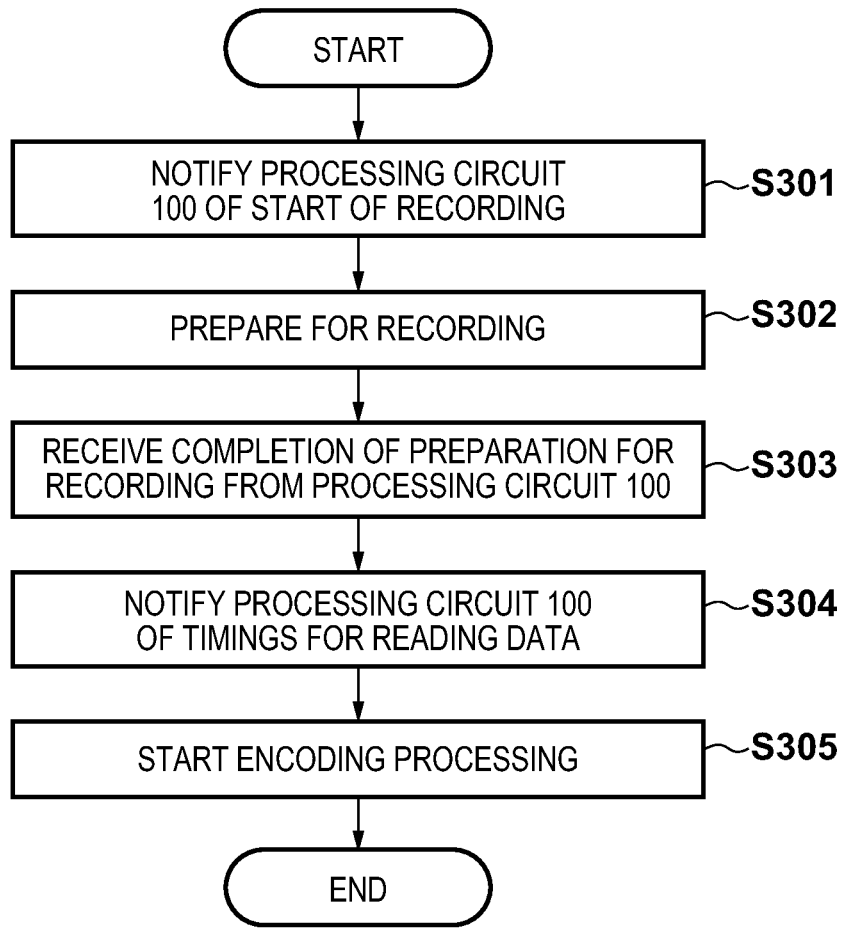
FIG. 3 is a flowchart of processing executed by a processing circuit 200 at the time of recording.

With reference to a flowchart of FIG. 3, the following describes processing executed by the processing circuit 200 at the time of starting the recording of moving image data. The processing of FIG. 3 is executed by the CPU 202 in the processing circuit 200 controlling relevant components.

When the power has been turned on by the operation unit 211, the CPU 202 sets the imaging apparatus 500 to an image capturing mode. Then, the CPU 202 starts to generate a timing signal using the clock control unit 204, and starts an operation for capturing moving images using the image capturing device 400 by controlling the image capturing device 400 in accordance with this timing signal. In the present embodiment, the image capturing device 400 outputs moving image data in which one frame includes 3840 pixels in the horizontal direction and 2160 pixels in the vertical direction, and a frame rate is 30 frames per second (fps). The CPU 202 acquires moving image data from the image capturing device 400 in accordance with the timing signal from the clock control unit 204, and stores the acquired moving image data in the memory 203. Thereafter, the size of the moving image data stored in the memory 203 is changed using the image processing unit 201, and the resized moving image data is stored in the memory 203 again. The display unit 208 reads frames in the moving image data from the memory 203 and displays the read frames.

If the operation unit 211 issues an instruction to start the recording in the image capture standby state described above, the CPU 202 notifies the processing circuit 100 of a command for recording preparation processing via a message communication unit 207c in the communication unit 207 (step S301). Note that processing executed by the processing circuit 100 will be described later with reference to a flowchart of FIG. 4. Next, the CPU 202 executes the recording preparation processing in the processing circuit 200 (step S302). More specifically, the CPU 202 sets a frame rate of moving images to which encoding processing is to be applied, a target data rate after the encoding, an encoding mode (in the processing circuit 200, all frames are encoded as IDR-I frames), and the like. The CPU 202 also notifies the processing circuit 100 of information showing the frame rate of moving images to which encoding processing is to be applied, the target data rate after the encoding, and the like via the message communication unit 207c, together with the command for the recording preparation processing.

Thereafter, if the CPU 202 receives a notification of completion of preparation for starting the recording of moving images from the processing circuit 100 via the message communication unit 207c (step S303), it executes processing for synchronizing the reading of frames with the processing circuit 100 (step S304). More specifically, the CPU 202 causes the message communication unit 207c to transmit, to the processing circuit 100, a control command indicating timings at which the processing circuit 100 should process moving image data. In this way, the processing circuits 100 and 200 are controlled to alternately process moving image data of every other frame acquired from the image capturing device 400. Then, the CPU 202 acquires moving image data from the image capturing device 400 in accordance with the timing signal from the clock control unit 204, and starts encoding processing for the acquired moving image data (step S305).

Figure 4:
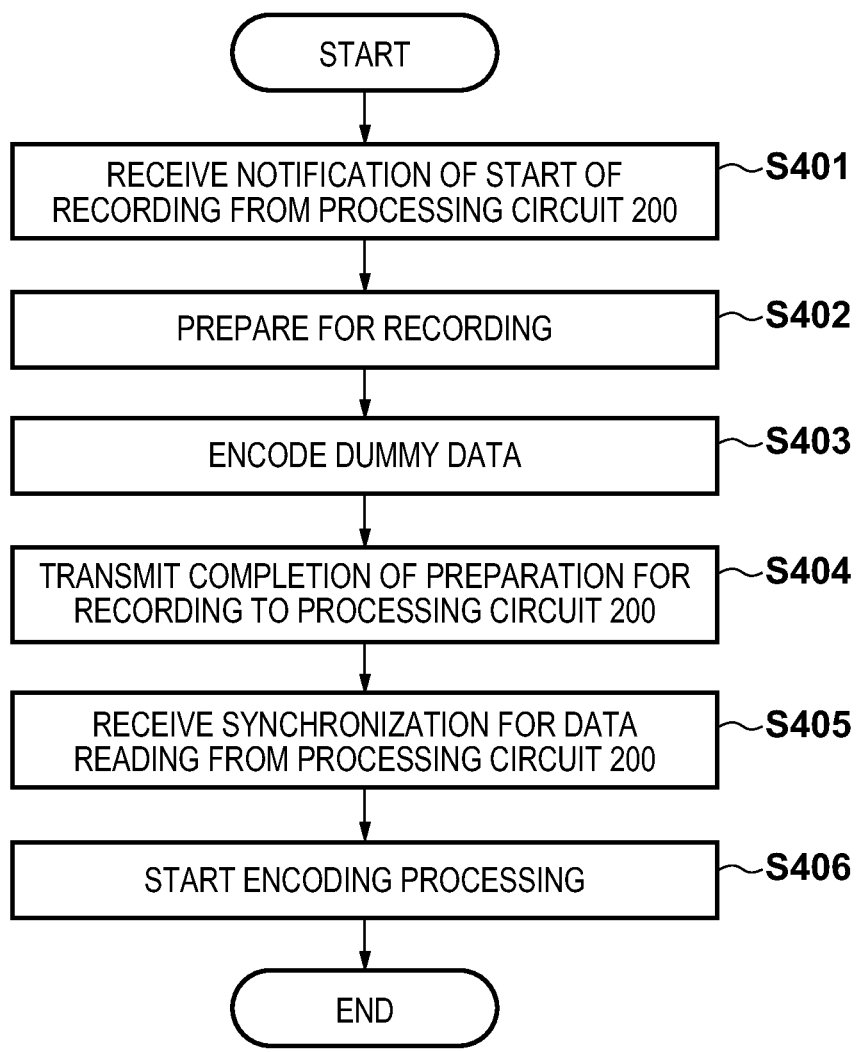
FIG. 4 is a flowchart of processing executed by a processing circuit 100 at the time of recording.

With reference to a flowchart of FIG. 4, the following describes processing executed by the processing circuit 100 at the time of starting the recording of moving image data. The processing of FIG. 4 is executed by the CPU 102 in the processing circuit 100 controlling relevant components.

If the message communication unit 107c receives a command indicating the start of the recording from the processing circuit 200 as mentioned earlier (step S401), the CPU 102 executes recording preparation processing in the processing circuit 100 (step S402). More specifically, the CPU 102 sets a frame rate of moving images to which encoding processing is to be applied, a target data rate after the encoding, an encoding mode (in the processing circuit 100, the first frame is encoded as a dummy IDR-I frame, and the second and subsequent frames are all encoded as I-frames), and the like.

Next, encoding processing is applied to dummy data using the codec unit 105 (step S403). The CPU 102 acquires moving image data of one frame from the image capturing device 400, and encodes the acquired moving image data as an IDR-I frame. The frame encoded here is the first frame indicated by 1202 in FIG. 12. The frame encoded here is dummy data and is not recorded in reality; therefore, it is discarded without being transmitted to the processing circuit 200. By thus discarding the first frame without recording the same, the occurrence of time lag in moving images to be recorded can be avoided.

Thereafter, the CPU 102 causes the message communication unit 107c to transmit a command indicating completion of preparation for the recording to the processing circuit 200 (step S404). Thereafter, if the message communication unit 107c receives a command indicating the timings for synchronization processing, the CPU 102 changes the timings for processing moving image data using the clock control unit 106 so as to process frames different from frames processed by the processing circuit 200 (step S405). Subsequently, the CPU 102 acquires moving image data from the image capturing device 400 in accordance with the timing signal from the clock control unit 104, and starts encoding processing (step S406).

As described above, the processing circuits 100 and 200 alternately acquire moving image data of every other frame acquired by the image capturing device 400, and apply encoding processing thereto.

Figure 5:
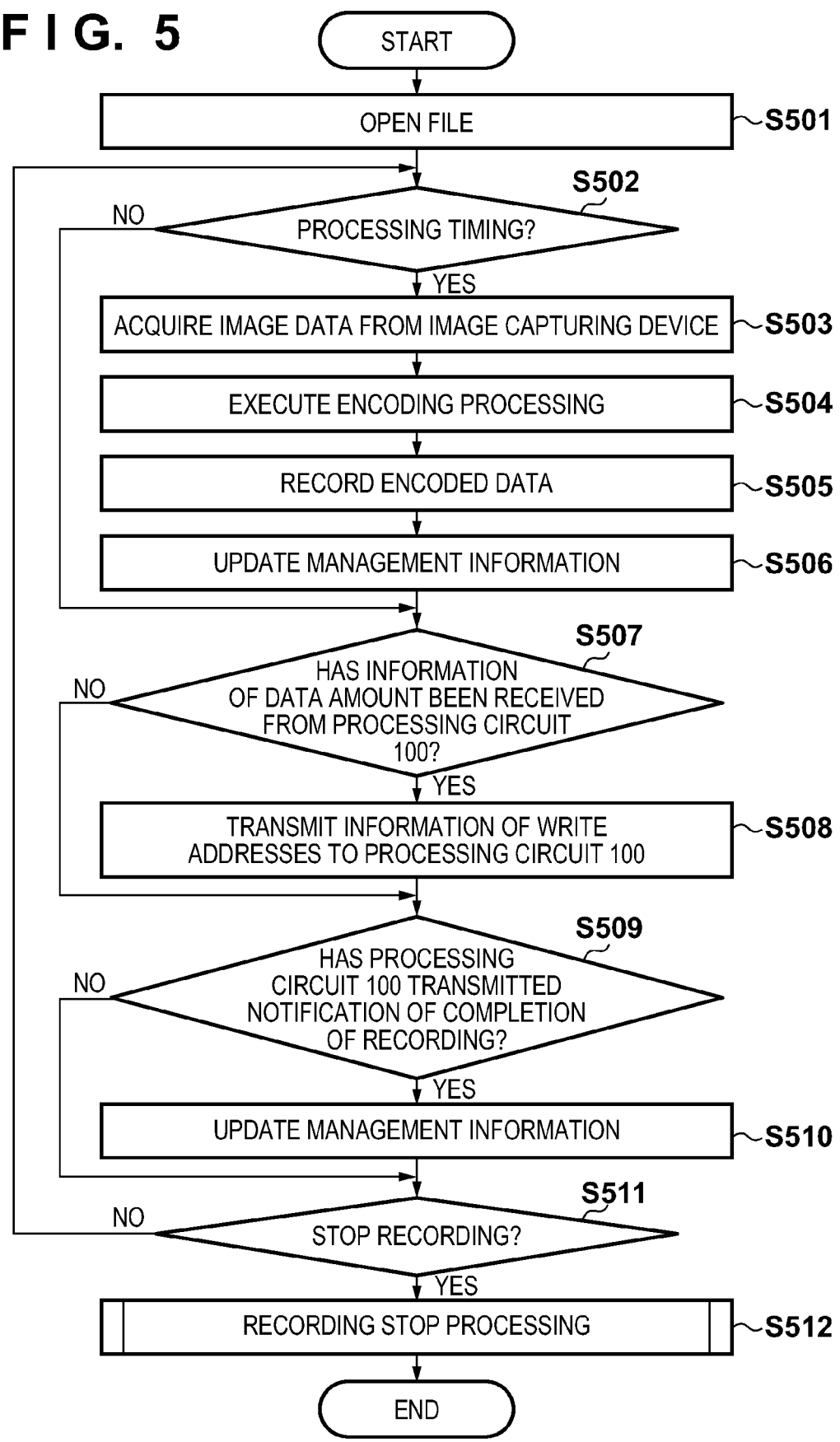
FIG. 5 is a flowchart of encoding processing executed by the processing circuit 200.

A description is now given of recording processing executed by each processing circuit. FIG. 5 is a flowchart of encoding processing executed by the processing circuit 200. The processing shown in FIG. 5 is executed by the CPU 202 controlling each component. First, prior to the recording, the file control unit 206 determines free space in the recording medium 212 based on management information (FAT) read from the recording medium 212. FIG. 7A shows an example of free space at the time of starting the recording. Provided that the clusters have a byte size of "0x1000" and continuous unused clusters are "0x000 to 0x010", "0x018 to 0x020" and "0x050 to 0x080", an unused address list shown in FIG. 7A including start addresses and end addresses is generated. The file control unit 206 generates the list shown in FIG. 7A, stores the generated list in the memory 203, and determines write addresses for writing data in the recording medium 212 based on this table showing free space.

The CPU 202 instructs the file control unit 206 to newly generate a moving image file (step S501). The file control unit 206 opens a new file to which data is to be written in the recording medium 212. Next, based on the timing signal from the timing control unit 204, the CPU 202 determines whether or not a timing for acquiring moving image data from the image capturing device 400 has arrived, that is to say, whether or not image data from the image capturing device 400 is targeted for processing in the processing circuit 200 (step S502). If the processing timing has not arrived yet, the processing moves to step S507.

If the processing timing for moving image data has arrived, the CPU 202 acquires moving image data of one frame from the image capturing device 400, causes the image processing unit 201 to convert the acquired moving image data into data of a YUV color space, and stores the converted data in the memory 203 (step S503). Next, the CPU 202 causes the codec unit 205 to encode the moving image data stored in the memory 203, and stores the encoded moving image data in the memory 203 (step S504). Upon completion of encoding processing for one frame, the control unit 202 instructs the file control unit 206 to write encoded data of this one frame. The file control unit 206 determines write addresses (recording position) based on free space in the recording medium 212, and instructs the recording/playback unit 210 to write data.

It should be noted that there are cases where the write addresses in the recording medium 212 cannot be determined because the processing circuit 100 has not transmitted information of a data amount of an immediately preceding frame in later-described step S507. In such cases, the CPU 202 holds encoded data in the memory 203 until the write addresses are determined. Once the write addresses have been determined, the recording/playback unit 210 reads the encoded data from the memory 203, and writes the read encoded data to designated addresses in the recording medium 212 (step S505). Upon completion of writing of data, the file control unit 206 updates the contents of the management information stored in the memory 203, as well as the free space list (step S506). FIG. 7B shows the free space list obtained after the data of the first frame has been written.

Based on information of the data size from the codec unit 205, the CPU 202 further calculates a relative position (offset address) of each frame from the head of the file, that is to say, from the position at which the recording was started, and stores the calculated relative position in the memory 203. This processing is executed to generate a later-described moov atom.

FIGS. 10A to 10C show recording states 1002, 1004 and 1006 of the recording medium 212, as well as contents and transitions of FAT 1001, 1003 and 1005, during the recording of moving images. FIGS. 10A to 10C show recording areas in the recording medium 212 for six clusters, starting from a start address (0x0000). If the free space in the recording medium 212 is as shown in FIG. 7A, moving image data (encoded data) of one frame is written from the start address. As a result, moving image data of the first frame is written to an area 1007. As the area 1007 extends across the first cluster and the second cluster, the file control unit 206 updates the contents of FAT as shown in a state 1001.

Next, the CPU 202 determines whether or not information of a data amount of encoded data has been received from the processing circuit 100 (step S507). It will be assumed that the information of the data amount of the encoded data has been received from the processing circuit 100. In this case, based on the last write address at which the recording/playback unit 210 immediately previously wrote moving image data in the recording medium 212, the CPU 202 determines write addresses of encoded data for the processing circuit 100. Then, the determined write addresses are transmitted from a data transmission unit 207a to the processing circuit 100 (step S508). At this time, these write addresses are also stored in the memory 203 in preparation for generation of the later-described moov atom.

As described above, the CPU 202 determines write addresses such that the processing circuit 100 writes encoded data to write addresses that are continuous with the last write address at which moving image data was immediately previously written. For example, if the information of the data amount of the encoded data has been received from the processing circuit 100 in the state of FIG. 10A, the following addresses are determined as write addresses: an address that follows the last address of the area 1007 through an address obtained by adding the data amount from the processing circuit 100.

Furthermore, based on the information of the data size transmitted from the processing circuit 100, the CPU 202 also calculates a position (offset) of this frame from the head of the file, and stores the calculated position in the memory 203.

After transmitting the information of the write addresses in the above manner, the CPU 202 determines whether or not the processing circuit 100 has transmitted a notification of completion of writing of encoded data from the processing circuit 100 (step S509). If a data receiving unit 207b has received the notification of completion of writing, the CPU 202 instructs the file control unit 206 to update FAT. The file control unit 206 updates the contents of FAT stored in the memory 203 in accordance with the writing performed by the processing circuit 100 (step S510). It will be assumed, for example, that the notification of completion of writing has been received from the processing circuit 100. In this case, a value obtained by adding the following together is determined (updated) as the next write address in the processing circuit 200: a write address set for the processing circuit 100 (equivalent to a value obtained by adding one to the last write address at the time of a prior storing operation executed by the processing circuit 200); and the data amount notified from the processing circuit 100. The file control unit 206 also updates the free space list stored in the memory 203. FIG. 7C shows the free space list obtained after the data of the second frame has been written.

For example, in the case of FIG. 10B, the processing circuit 100 writes moving image data of one frame to an area 1008 in accordance with the write addresses designated by the CPU 202. Then, the file control unit 206 updates the contents of FAT as shown in a state 1003 in accordance with writing of data to this area 1008.

Subsequently, the CPU 202 determines whether or not the operation unit 211 has output an instruction to stop the recording (step S511). If the instruction to stop the recording has not been output, the CPU 202 returns to step S502 and continues the processing. On the other hand, if the instruction to stop the recording has been output, the CPU 202 executes recording stop processing (step S512).

As described above, if a processing timing for the next frame has arrived, processing for the next frame can be executed in the processing circuit 200 without waiting for completion of writing of encoded data in the processing circuit 100. This realizes a reduction in the burden of processing on the processing circuit 200.

Figure 6:
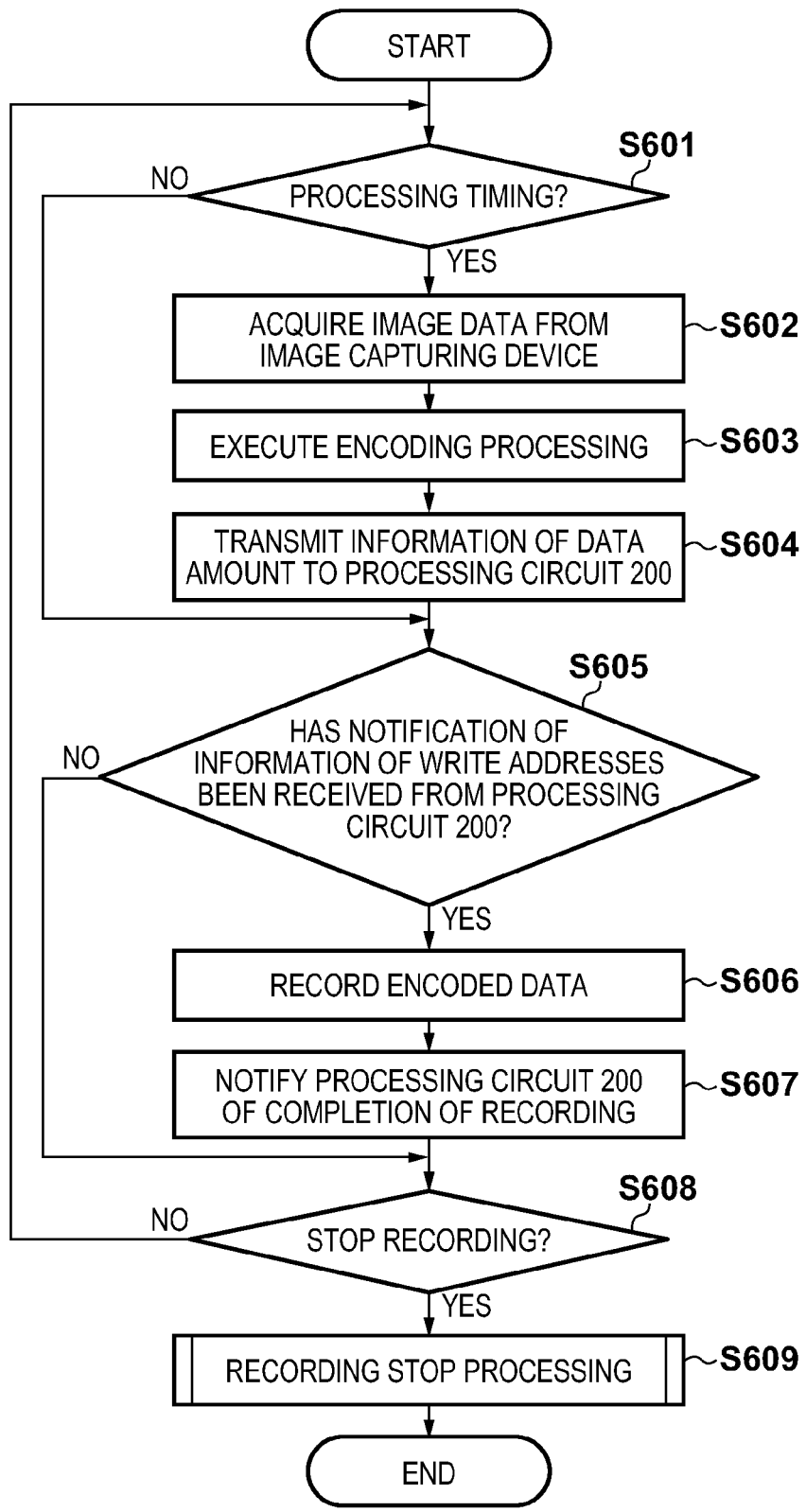
FIG. 6 is a flowchart of encoding processing executed by the processing circuit 100.

FIG. 6 is a flowchart of encoding processing executed by the processing circuit 100. The processing shown in FIG. 6 is executed by the CPU 102 controlling each component. Based on the timing signal from the clock control unit 106, the CPU 102 determines whether or not a timing for acquiring moving image data from the image capturing device 400 has arrived (step S601). If the processing timing has not arrived yet, the processing moves to step S605.

If the processing timing for moving image data has arrived, the CPU 102 acquires moving image data of one frame from the image capturing device 400, causes the image processing unit 101 to convert the acquired moving image data into data of a YUV color space, and stores the converted data in the memory 103 (step S602). Next, the CPU 102 causes the codec unit 105 to encode the moving image data stored in the memory 103, and stores the encoded moving image data in the memory 103 (step S603). Upon completion of the encoding processing for one frame, information of the size of the moving image data of this one frame is transmitted from the message communication unit 107c to the processing circuit 200. Note that information of a data amount of encoded data is transmitted to the processing circuit 200 irregularly under control by the CPU 102.

Next, the CPU 102 determines whether or not information of write addresses in the recording medium 212 has been received from the processing circuit 200 (step S605). If the information of write addresses has been received, the CPU 102 instructs the recording/playback unit 104 to write encoded data of one frame stored in the memory 103 at designated write addresses in the recording medium 212. The recording/playback unit 104 reads encoded moving image data of one frame from the memory 103, and writes the read moving image data into the designated write addresses in the recording medium 212 (step S606).

Upon completion of writing of the encoded data, the CPU 102 causes the message communication unit 107c to transmit a notification of completion of writing to the processing circuit 200 (step S607). Subsequently, the CPU 102 determines whether or not a notification of stopping of the recording has been received from the processing circuit 200 (step S608). If the notification of stopping of the recording has not been received, the CPU 102 returns to step S601 and continues the processing. On the other hand, if the notification of stopping of the recording has been received, the CPU 102 executes recording stop processing (step S609).

Figure 8:
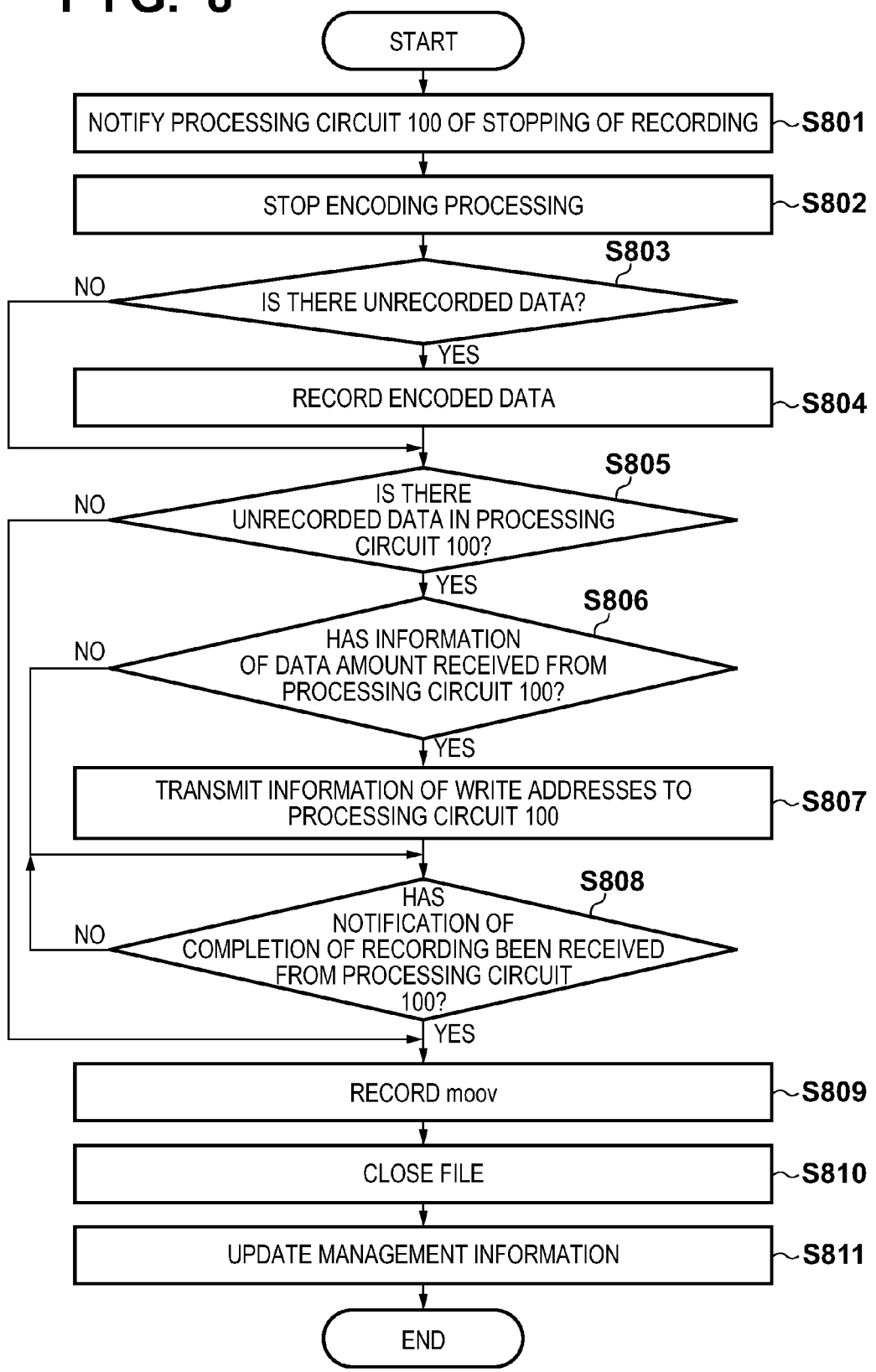
FIG. 8 is a flowchart of processing executed by the processing circuit 200 when the recording is stopped.

The following describes processing executed when the recording is stopped. FIG. 8 is a flowchart of processing executed by the processing circuit 200 when the recording is stopped. The processing shown in FIG. 8 is realized by the CPU 202 controlling each component.

If the operation unit 211 has issued an instruction to stop the recording (or a recording completion instruction), the CPU 202 causes the message communication unit 207c to notify the processing circuit 100 of the stopping of the recording (recording completion instruction information) (step S801). Next, the CPU 202 stops the encoding processing of the codec unit 205 (step S802), and determines whether or not unrecorded data is stored in the memory 203 (step S803). Here, the CPU 202 detects the instruction to stop the recording from the operation unit 211 in synchronization with a frame timing. Therefore, if the CPU 202 detects the instruction to stop the recording while the codec unit 205 is encoding a frame, it stops the encoding processing of the codec unit 205 upon completion of encoding of that frame. In this case, encoded moving image data is stored in the memory 203 as unrecorded data.

If unrecorded data is stored in the memory 203, the CPU 202 instructs the file control unit 206 to record this encoded data. The file control unit 206 designates write addresses in the recording medium 212 as described above, and instructs the recording/playback unit 210 to record the encoded data. The recording/playback unit 210 reads the encoded data from the memory 203 and records the read encoded data in the recording medium 212 (step S804).

If unrecorded data is not stored in the memory 203 in step S803, the CPU 202 determines whether or not it has received a notification indicative of the presence of unrecorded data from the processing circuit 100 (step S805). If the CPU 202 has received a notification indicative of the presence of unrecorded data from the processing circuit 100, it determines whether or not information of a data amount has been received from the processing circuit 100 (step S806). If information of a data amount of encoded data has been received from the processing circuit 100, the CPU 202 determines write addresses of the encoded data for the processing circuit 100 based on the last write address at which the recording/playback unit 210 immediately previously wrote moving image data in the recording medium 212 as described above. Then, the determined write addresses are transmitted from the data transmission unit 207a to the processing circuit 100 (step S807). Subsequently, the CPU 202 determines whether or not a notification of completion of the recording has been received from the processing circuit 100 (step S808).

If the notification of completion of the recording has been received from the processing circuit 100, the CPU 202 generates moov data for the MOV file recorded in the recording medium 212 based on the offset data stored in the memory 203. The CPU 202 then instructs the file control unit 206 to record this moov data. The file control unit 206 detects free space in the recording medium 212 and determines write addresses of the moov data. Then, the recording/playback unit 210 is instructed to record the moov data at these write addresses. The recording/playback unit 210 reads the moov data from the memory 203 and records the read moov data in the recording medium 212 in step S809.

FIGS. 10D to 10F show recording states 1012, 1014 and 1016 of the recording medium 212, as well as contents and transitions of FAT 1011, 1013 and 1015, in the recording stop processing. FIG. 10D shows the state where the recording of moving image data has completed. FIG. 10E shows the state where moov data has been written.

Upon completion of writing of the moov data, the CPU 202 instructs the file control unit 206 to close the file that is being recorded (S810). At this time, the CPU 202 instructs the file control unit 206 to arrange an mdat atom posterior to a moov atom in a single MOV file. The file control unit 206 updates the management information stored in the memory 203 in accordance with recording addresses of the MOV file for which recording has completed, and then instructs the recording/playback unit 210 to write this management information at predetermined addresses in the recording medium 212. The recording/playback unit 210 updates the management information in the recording medium 212 by reading the management information from the memory 203 and recording the read management information in the recording medium 212 (step S811). The file control unit 206 also updates the free space list stored in the memory 203. FIG. 10F shows the states of the MOV file and FAT upon completion of processing for closing the file. As indicated by 1015, FAT is updated in such a manner that cluster 1 at the head of mdat follows immediately after cluster 6 in which moov is recorded.

Figure 9:
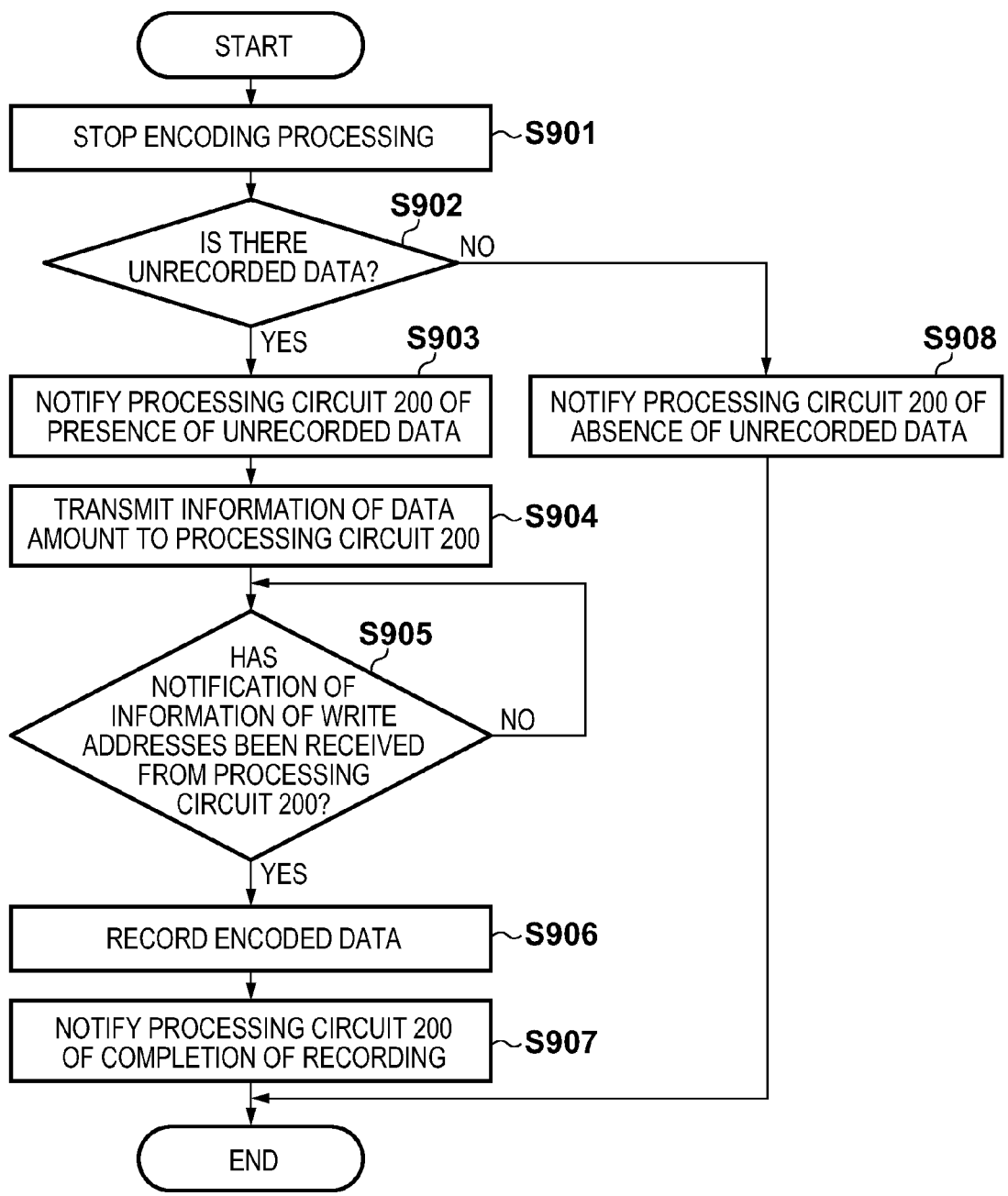
FIG. 9 is a flowchart of processing executed by the processing circuit 100 when the recording is stopped.

FIG. 9 is a flowchart of processing executed by the processing circuit 100 when the recording is stopped. The processing shown in FIG. 9 is realized by the CPU 102 controlling each component.

When the message communication unit 107*c* receives a command for stopping the recording from the processing circuit 200, the flow is started, and the CPU 102 stops the encoding processing of the codec unit 105 (step S901). Next, the CPU 102 determines whether or not untransmitted encoded data is stored in the memory 103 (step S902), and if untransmitted data is stored, causes the data transmission unit 107*b* to transmit a notification indicative of the presence of unrecorded data to the processing circuit 200 (step S903). Thereafter, the CPU 102 transmits information of a data amount of encoded moving image data to the processing circuit 200 as described above (step S904), and determines whether or not a notification of write addresses has been received from the processing circuit 200 (step S905).

If the write addresses have been received, the CPU 102 instructs the recording/playback unit 104 to record the encoded data. The recording/playback unit 104 reads the encoded data from the memory 103 and records the read encoded data in the recording medium 212 (step S906). Upon completion of recording of the encoded data in the recording medium 212, the CPU 102 causes the message communication unit 107*c* to notify the processing circuit 200 of completion of recording of all encoded data (step S907). If unrecorded data is not stored in the memory 103 in step S902, the CPU 102 notifies the processing circuit 200 of the absence of unrecorded data (step S908).

The following describes timings of encoding processing for moving image data executed by the processing circuits 100 and 200 with reference to FIG. 11.

In FIG. 11, reference sign 1101 indicates a period of a frame corresponding to the frame rate of recorded moving image data. In the present embodiment, the frame rate of moving image data generated by the image capturing device 400 and the frame rate of recorded moving images are both 30 fps, and therefore a frame interval 1101 is 1/30 seconds. Reference sign 1102 indicates a frame interval at which the processing circuit 200 processes each frame in the moving image data. Reference sign 1103 indicates a frame interval at which the processing circuit 100 processes each frame in the moving image data. As the processing circuits 100 and 200 alternately process moving image data of every other frame output from the image capturing device 400, each of the frame intervals 1102 and 1103 is double the frame interval of recorded moving images.

Reference sign 1104 indicates a time period in which the processing circuit 200 acquires moving image data of one frame from the image capturing device 400, and reference sign 1105 indicates a time period in which the processing circuit 200 applies encoding processing to moving image data of one frame. Reference sign 1106 indicates a time period in which the processing circuit 100 acquires moving image data of one frame from the image capturing device 400, and reference sign 1107 indicates a time period in which the processing circuit 100 applies encoding processing to moving image data of one frame. Reference sign 1108 indicates a time period in which the processing circuit 100 records encoded data.

Reference sign 1109 indicates processing in which the processing circuit 100 transmits information of a data amount of encoded data to the processing circuit 200. Reference sign 1110 indicates processing in the processing circuit 200 notifies the processing circuit 100 of write addresses. Reference sign 1111 indicates a notification of completion of writing of encoded data by the processing circuit 100.

As shown in FIG. 11, if only one of the processing circuits 100 and 200 processes moving image data of a frame rate corresponding to the frame interval 1101, it is necessary to complete processing for acquiring and encoding moving image data of one frame within the time period of the frame interval 1101.

On the other hand, according to the present embodiment, the two processing circuits 100 and 200 apply encoding processing to moving image data in parallel, and therefore each processing circuit need not complete the processing for acquiring and encoding moving image data of one frame within the time period of the frame interval 1101.

Furthermore, according to the present embodiment, when the processing circuit 100 has completed the encoding processing for moving images of one frame, information of a data amount of encoded data is transmitted to the processing circuit 200. This enables the processing circuit 200 to start the encoding processing for the next frame before receiving a data amount of encoded data from the processing circuit 100.

In addition, as the processing circuit 200 determines write addresses of encoded data for the processing circuit 100 and transmits the write addresses to the processing circuit 100, moving image data is recorded in the recording medium 212 in order of image capture.

A description is now given of playback processing. It will be assumed that the playback and display are performed by the display unit 208 included in the present apparatus. In the embodiment, while the image capturing device 400 has a high resolution of 3840 pixels in the horizontal direction and 2160 pixels in the vertical direction, the display unit 208 does not have such a high resolution. Therefore, frame images obtained by decoding are displayed in a reduced size.

Figure 13:
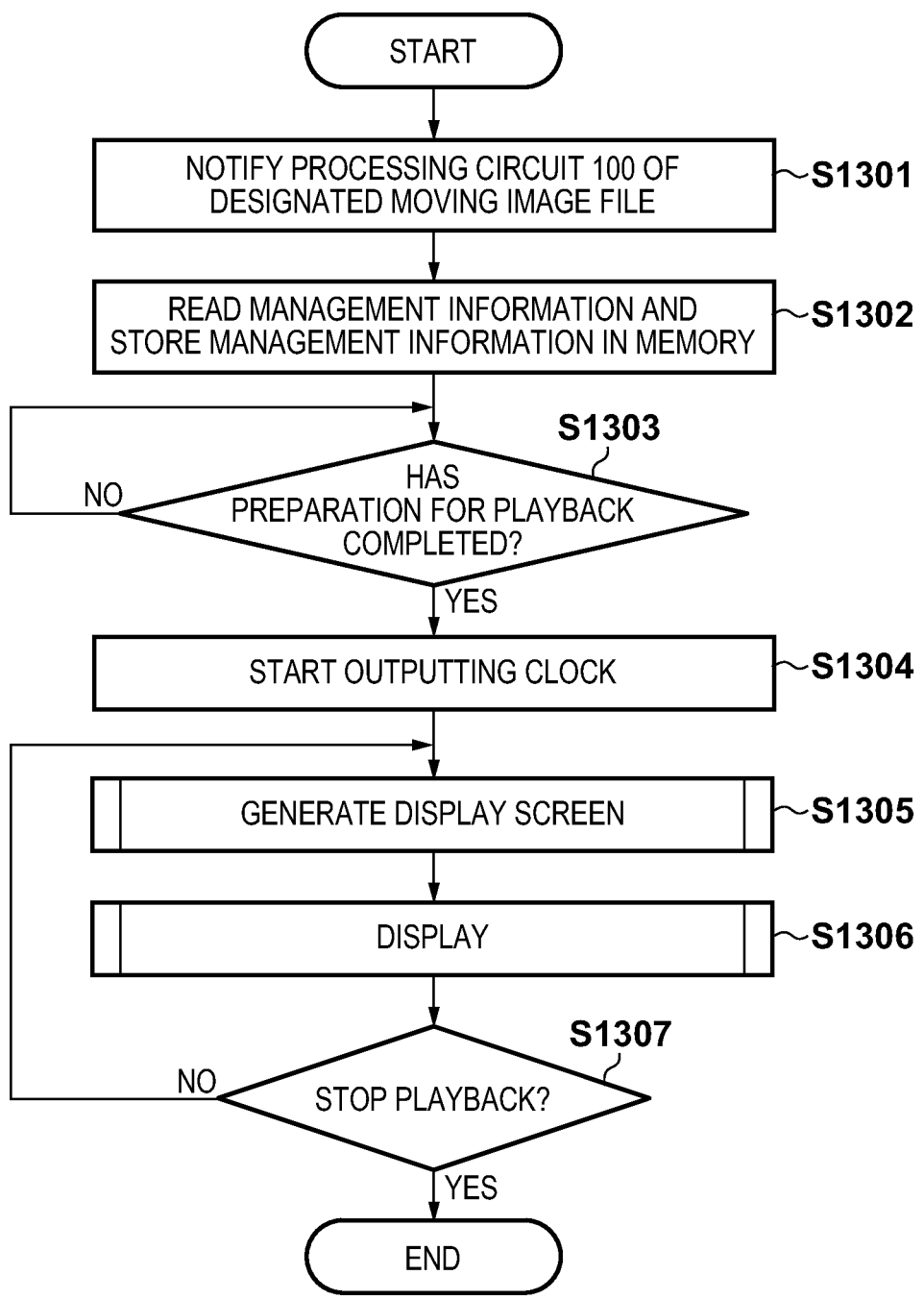
FIG. 13 is a flowchart of processing executed by the processing circuit 200 at the time of playback.

FIG. 13 is a flowchart of processing executed by the processing circuit 200 at the time of playback. The processing shown in FIG. 13 is realized by the CPU 202 controlling each component. If the operation unit 211 has issued an instruction to switch to a playback mode, the CPU 202 instructs the recording/playback unit 210 to read a management file for managing moving image files recorded in the recording medium 212. Then, based on the read management file, the CPU 202 displays an index screen for the moving image files recorded in the recording medium 212 on the display unit 208. If the user selects one of the moving image files displayed on the display unit 208 and issues an instruction to start playback by operating the operation unit 211, the processing shown in FIG. 13 is started.

The CPU 202 causes the message communication unit 207*c* to notify the processing circuit 100 of identification information showing a file name and the like of the moving image file selected by the user (step S1301). Next, the CPU 202 controls the recording/playback unit 210 to read data of a moov atom in the selected moving image file and stores the read data in the memory 203 (step S1302). Based on the information of the moving image file notified from the processing circuit 200 in step S1301, the CPU 102 in the processing circuit 100 instructs the recording/playback unit 104 to read the moov atom in the selected moving image file from the recording medium 212. The recording/playback unit 104 reads the moov atom in the selected moving image file from the recording medium 212 and stores the read moov atom in the memory 103. Once the CPU 102 has stored the data of the moov atom in the memory 103, it causes the message communication unit 107*c* to transmit information indicative of completion of preparation for playback to the processing circuit 200. Through the above procedure, information necessary for playback processing for moving image data is shared between the processing circuits 100 and 200.

The CPU 202 thus waits for a notification of completion of preparation for playback from the processing circuit 100 (step S1303). If the notification of completion of preparation for playback has been received, CPU 202 controls the clock control unit 204 to start outputting a decode clock and a display clock, the decode clock indicating a decode timing for moving image data, and the display clock indicating a display timing for the display unit 208 (step S1304). The decode clock is determined based on information of the moov atom. Also, the CPU 102 controls the clock control unit 106 to start outputting a decode clock. Note that the display clock is determined in accordance with the ability of the display unit 208.

Subsequently, the CPU 202 executes processing for generating a display screen using the decoded moving image data (step S1305), and displays the generated display screen on the display unit 208 (step S1306). Then, the CPU 202 determines whether or not the operation unit 211 has issued an instruction to stop the playback (step S1307), and continues the processing until the issuance of the instruction to stop the playback.

The processing circuits 100 and 200 execute decoding processing for moving image data at a timing based on a decode clock. Furthermore, as will be described later, the processing circuit 200 generates a display screen by executing reduction processing for a playback image at a timing based on a display clock. On the other hand, the processing circuit 100 generates a display screen by executing reduction processing for a playback image at a timing independent of a display timing.

Furthermore, in the present embodiment, the processing circuits 100 and 200 alternately apply decoding processing to moving image data of every other frame that has been played back, as will be described later. Therefore, in step S1301, the processing circuit 200 notifies the processing circuit 100 of a number of a frame in moving image data that should be processed by the processing circuit 100 via the message communication unit 207c.

Furthermore, in the display processing of step S1306, the generated display screen is displayed on the display unit 208 at a timing based on a display clock. A frame displayed at this time is either generated by the processing circuit 100 or generated by the processing circuit 200. Processing for determining which one of the frames generated in the two processing circuits should be used will be described later.

The following describes display screen generation processing (step S1305) executed by the processing circuit 200. FIG. 14 is a flowchart of display screen generation processing executed by the processing circuit 200. The processing shown in FIG. 14 is executed by the CPU 202 controlling each component.

The processing circuit 200 generates a display screen by decoding moving image data of one frame at a timing based on a decode clock, and by reducing the size of the decoded moving image data to match the resolution of the display unit 208 at a timing based on a display clock.

First, the CPU 202 determines whether or not a decode timing based on a decode clock has arrived (step S1401). If the decode timing has arrived, the CPU 202 requests the recording/playback unit 210 to read moving image data of one frame. Then, the CPU 202 causes the codec unit 205 to decode the read moving image data of one frame (step S1402), and stores the decoded moving image data in the memory 203 (step S1403).

Next, the CPU 202 determines whether or not a display timing based on a display clock has arrived (step S1404). If the display timing has arrived, the CPU 202 controls the image processing unit 201 to reduce the size of the decoded moving image data of one frame stored in the memory 203, and stores the resized moving image data in a storage area for display screens in the memory 203 (step S1406). The CPU 202 generates display screens by repeating the processing shown in FIG. 14 until the issuance of an instruction to stop the playback.

Figure 15:
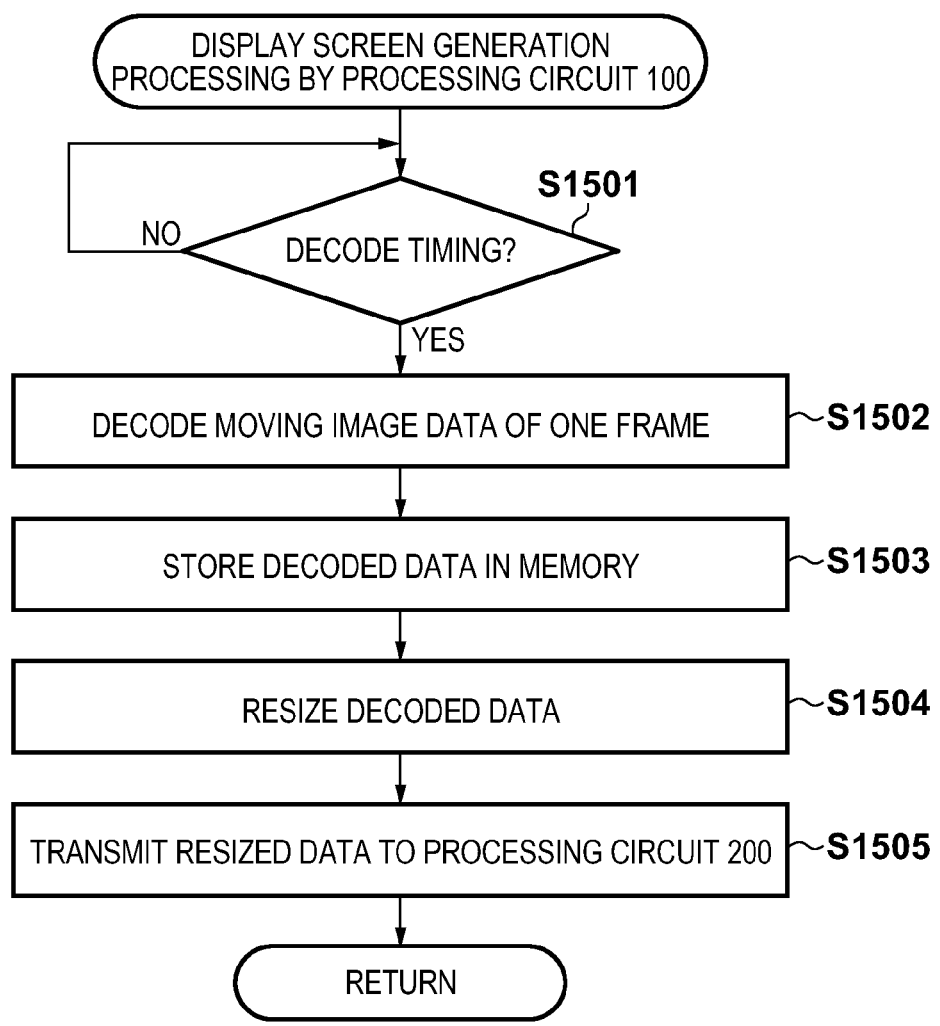
FIG. 15 is a flowchart of decoding processing for moving image data executed by the processing circuit 100.

The following describes display screen generation processing executed by the processing circuit 100. FIG. 15 is a flowchart of display screen generation processing executed by the processing circuit 100. The processing shown in FIG. 15 is executed by the CPU 102 controlling each component.

The processing circuit 100 decodes moving image data of one frame at a timing based on a decode clock, and subsequently executes processing for reducing the screen size of the decoded moving image data.

First, the CPU 102 determines whether or not a decode timing based on a decode clock has arrived (step S1501). If the decode timing has arrived, the CPU 102 requests the recording/playback unit 104 to read moving image data of one frame. The recording/playback unit 104 reads designated moving image data from the recording medium 212 and stores the read moving image data in the memory 103. The codec unit 205 decodes the moving image data of one frame stored in the memory 103 (step S1502), and stores the decoded moving image data in the memory 103 (step S1503).

Upon completion of decoding processing for the moving image data of one frame, the CPU 102 controls the image processing unit 101 to reduce the size of the decoded moving image data of one frame stored in the memory 103 to match the resolution of the display screen 208 (step S1504). The CPU 102 then causes the data transmission unit 107b to transmit the moving image data of a reduced size to the processing circuit 200. The data receiving unit 207b stores the received moving image data in a storage area for display screens in the memory 203 (step S1505). The CPU 102 generates display screens by repeating the processing shown in FIG. 15 until the issuance of an instruction to stop the playback.

As described above, the processing circuits 100 and 200 can realize both the efficient memory use and the maintenance of playback speed by executing resize processing in different procedures. More specifically, in the processing circuit 200, the resize processing is executed in accordance with a display timing for the display unit 208. In this way, a storage area in the memory 203 for storing resized frames can be minimized, and the memory 203 can be efficiently used. On the other hand, the processing circuit 100, which transfers moving image data via the data bus 300, executes decoding processing, resize processing, and transfer processing continuously; as a result, overhead in communication via the data bus 300 can be compensated for, and decoded moving image data is promptly transmitted to the processing circuit 200. In the present embodiment, a storage area for three frames is prepared as a storage area for display screens in the memory 203. Upon completion of resize processing for one new frame, data of the oldest frame is deleted and data of the new frame is stored.

Figure 16:
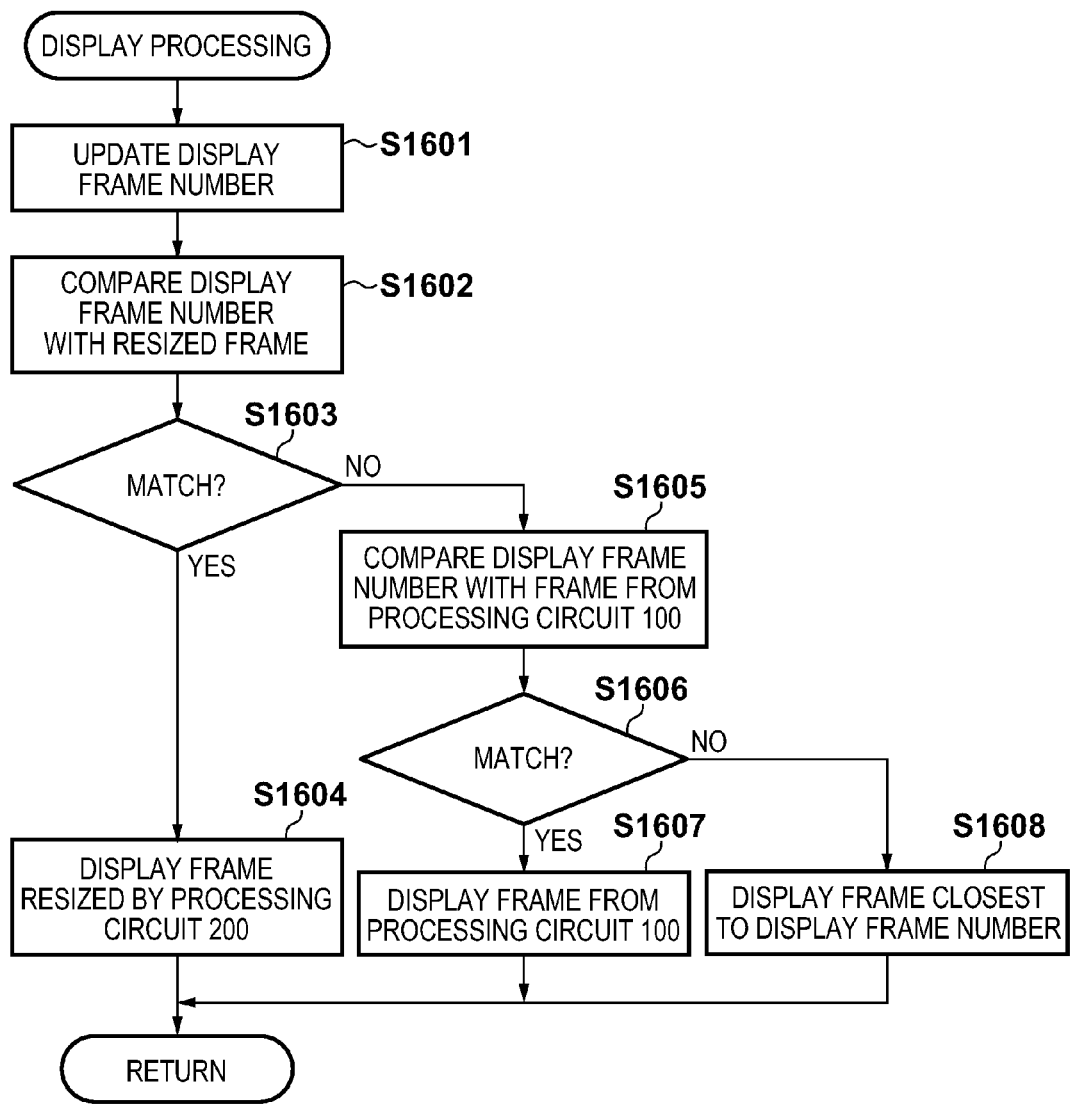
FIG. 16 is a flowchart of display processing executed by the processing circuit 200.

A description is now given of display processing for decoded moving image data executed by the processing circuit 200. FIG. 16 is a flowchart of display processing executed by the processing circuit 200. The processing shown in FIG.

16 is executed by the CPU 202 controlling each component. Note that the processing shown in FIG. 16 is executed based on a display clock.

First, the CPU 202 updates a frame number of a frame to be displayed (step S1601). A frame number herein refers to a number indicating the order of a frame counted from the beginning of moving images. It will be assumed that the first frame has a frame number 1, the second frame has a frame number 2, the third frame has a frame number 3, and so on; that is to say, a frame number increases in increments of one. In the present embodiment, a display frame number is updated using a decode clock. More specifically, if a decode clock has occurred between the last update in the display frame number and step S1601, the display frame number is increased by one; if the decode clock has not occurred therebetween, the display frame number is not changed.

Next, the CPU 202 compares the display frame number with a frame number of a frame that has been stored in the memory 203 after being resized by the processing circuit 200 (step S1602). If these frame numbers match (step S1603), the CPU 202 reads moving image data of the frame to which resize processing was applied by the processing circuit 200 from the memory 203, and supplies/displays the read moving image data to/on the display unit 208 (step S1604).

On the other hand, if the display frame number does not match the frame number of the frame to which the resize processing was applied by the processing circuit 200 (step S1603), the CPU 202 compares the display frame number with a frame number of a frame that has been stored in the memory 203 after being resized by the processing circuit 200 (step S1605). Whether or not these frame numbers match is determined (step S1606). If these frame numbers match, the CPU 202 reads moving image data of the frame that has been stored in the memory 203 after the processing circuit 100 applied resize processing thereto from the memory 203, and supplies/displays the read moving image data to/on the display unit 208 (step S1607).

If the display frame number does not match the frame number of the frame to which the resize processing was applied by the processing circuit 100, the CPU 202 selects, from among resized frames stored in the memory 203, a frame whose frame number is closest to the display frame number. Then, the CPU 202 reads moving image data of the selected frame from the memory 203, and transmits/displays the read moving image data to/on the display unit 208 (step S1608).

Figure 17:
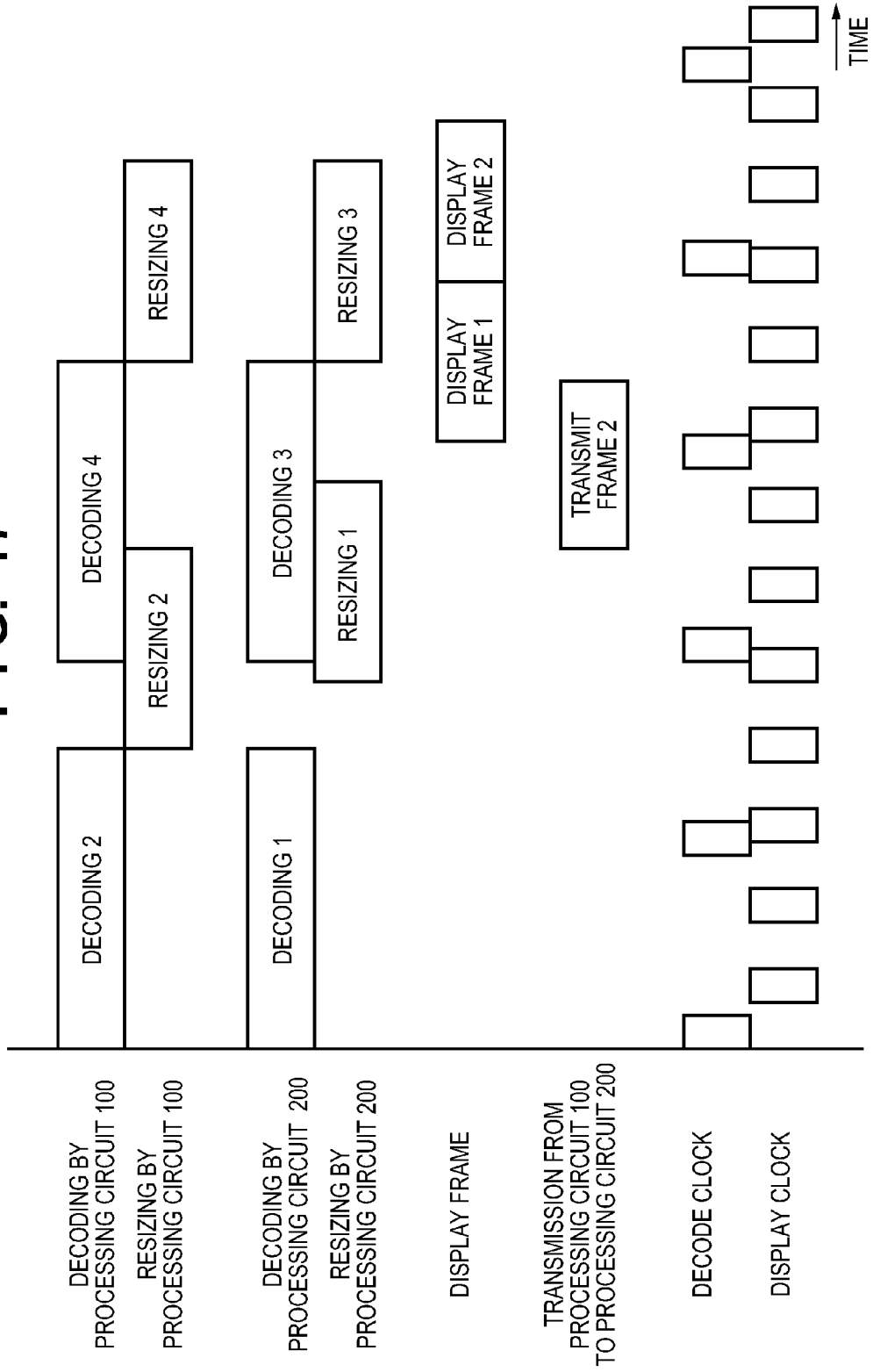
FIG. 17 shows timings of processing executed by the processing circuits 100 and 200 at the time of playback of moving image data.

FIG. 17 is a timing chart showing decoding and display processing for moving image data executed by the processing circuits 100 and 200 at the time of playback. As shown in FIG. 17, the processing circuits 100 and 200 decode moving image data of one frame at a timing based on a decode clock. The processing circuit 100 executes resize processing in succession to decoding processing for moving image data, and transmits data of the resized frame to the processing circuit 200 in succession to the resize processing.

On the other hand, the processing circuit 200 does not execute resize processing immediately after completion of decode processing for moving image data, but executes resize processing at a timing based on the next display clock.

As described above, in the present embodiment, moving image data with a large number of pixels and a high frame rate can be played back using two processing circuits. Furthermore, when playing back moving image data using two processing circuits, overhead in data transfer between the processing circuits can be compensated for by efficiently using a memory.

The above has described encoding and decoding processing according to the embodiment. According to the configuration of the present embodiment, in the processing shown in FIG. 5, upon completion of encoding of moving image data of one frame, write addresses for the processing circuit 200 are determined, and the encoded data is written to the recording medium 212; however, other configurations may instead be used. For example, upon completion of encoding of moving image data of one frame, the CPU 202 determines write addresses of encoded data of this one frame, but the encoded data is not written to the recording medium 212. In this case, when a data amount of encoded data stored in the memory 203 has reached a threshold for starting the writing, the encoded data is written at write addresses of frames that have been determined in advance by the recording/playback unit 210.

Similarly, in the processing of FIG. 6, upon receiving write addresses from the processing circuit 200, information of these write addresses may be stored without recording encoded data. In this case, when a data amount of encoded data stored in the memory 103 has reached a threshold for the writing, the encoded data is written at write addresses of frames that have been determined in advance by the recording/playback unit 104.

The file control unit 206 updates management information stored in the memory 203 when the recording/playback units 210 and 104 have completed the writing of data.

With the above configuration, the processing circuit 100 need not notify the processing circuit 200 of completion of the writing each time the wiring of encoded data of one frame has completed.

Furthermore, as the processing circuits execute writing with respect to the recording medium 212 asynchronously when a data amount of unrecorded data stored in the memories 103 and 203 has reached a threshold, there is a possibility that write timings may overlap.

In this case, the recording/playback unit 210 notifies the CPU 202 of overlapping of record timings, and the CPU 202 instructs the CPU 102 in the processing circuit 100 about write timings such that the processing circuits alternately write encoded data of one frame.

Furthermore, in the present embodiment, write addresses are determined such that storage areas (logical addresses) for data recorded by the processing circuits 100 and 200 are continuous on the recording medium 212.

Alternatively, for example, write addresses may be determined in units of writing of data to the recording medium 212.

More specifically, data is written to the recording medium 212 in units of clusters as shown in FIGS. 18A to 18C. Therefore, as shown in FIG. 18A, if encoded data of the first frame is written until the middle of cluster 2, invalid data (padding data) is written to the remaining area in cluster 2. A start address of cluster 3 is set as a write address of the second frame. Therefore, as shown in FIG. 18B, data of the second frame is written from the start address of cluster 3. If data of the second frame is written until the middle of cluster 4, invalid data is written to the remaining area in cluster 4, and a start address of cluster 5 is set as a write address of the third frame.

For example, by thus determining write addresses in units of writing with respect to the recording medium 212, if a memory card is used that guarantees a write speed when writing is executed in such units of writing, moving image data can be written at high speed. Therefore, even if the data rate of encoded moving image data is increased, the recording can be reliably executed.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-281751, filed Dec. 25, 2012, which is hereby incorporated by reference herein in its entirety.

What is claimed is:

1. An imaging apparatus comprising:
an imaging unit;
a first processing circuit including a first CPU and a first communication unit, the first processing circuit acquiring moving image data from the imaging unit and recording the acquired moving image data in a recording medium; and
a second processing circuit including a second CPU and a second communication unit, the second processing circuit acquiring, from the imaging unit, moving image data of a frame that is different from a frame acquired by the first processing circuit, and recording the acquired moving image data in the recording medium,
wherein the first CPU communicates with the second processing circuit using the first communication unit, and the second CPU communicates with the first processing circuit using the second communication unit,
wherein the second CPU determines a recording position in the recording medium at which the first processing circuit is to record moving image data, and causes the second communication unit to transmit information of the recording position to the first processing circuit, and
wherein the first processing circuit records moving image data in the recording medium in accordance with the information of the recording position transmitted from the second processing circuit.

2. The imaging apparatus according to claim 1, wherein
the first CPU causes the first communication unit to output, to the second CPU, information of a data amount of moving image data processed by the first processing circuit, and
the second CPU determines the recording position at which the first processing circuit is to record moving image data based on the information of the data amount received from the first communication unit.

3. The imaging apparatus according to claim 2, wherein
the second CPU waits to record moving image data of a frame to be recorded by the second processing circuit until the second CPU receives, from the first processing circuit, information of a data amount of a frame that is to be recorded by the first processing circuit and that precedes the frame to be recorded by the second processing circuit.

4. The imaging apparatus according to claim 2, wherein
the second CPU determines a next address that follows a recording address of a frame recorded by the second processing circuit through an address obtained by adding the data amount to the next address, in the recording medium, as a recording position of moving image data of a frame to be recorded by the first processing circuit following the frame recorded by the second processing circuit.

5. The imaging apparatus according to claim 1, wherein
the second CPU causes the second communication unit to transmit, to the first processing circuit, information for controlling the first processing circuit such that the first processing circuit and the second processing circuit alternately acquire moving image data of different frames.

6. The imaging apparatus according to claim 1, wherein
the first processing circuit and the second processing circuit encode moving image data acquired from the imaging unit, and
the CPU causes the first communication unit to output, to the second processing circuit, information of a data amount of moving image data of one frame encoded by the first processing circuit.

7. The imaging apparatus according to claim 6, wherein
the first processing circuit and the second processing circuit encode moving image data acquired from the imaging unit without using inter-frame predictive encoding.

8. The imaging apparatus according to claim 1, wherein
moving image data is recorded in the recording medium as a file, and
the second CPU generates, based on a recording position of a plurality of frames of moving image data recorded by the first processing circuit and on a recording position of a plurality of frames of moving image data recorded by the second processing circuit, management information that shows offsets of the plurality of frames from a head of the file in moving image data recorded in the recording medium, and stores the generated management information in the file.

9. The imaging apparatus according to claim 1, wherein
the first processing circuit and the second processing circuit alternately acquire moving image data of every other frame from the imaging unit.

10. The imaging apparatus according to claim 1, wherein
the second CPU determines a recording position in the recording medium at which the second processing circuit is to record moving image data.

11. The imaging apparatus according to claim 1, wherein
the first processing circuit is configured as a single integrated circuit, and the second processing circuit is configured as a single integrated circuit different from the first processing circuit.

12. The imaging apparatus according to claim 1, wherein
the imaging unit outputs moving image data in which each frame of the moving image data one frame includes 3840 pixels in the horizontal direction and 2160 pixels in the vertical direction.

13. An imaging apparatus comprising:
an imaging unit;
a first processing circuit including a first CPU and a first communication unit, the first processing circuit acquiring moving image data from the imaging unit and recording the acquired moving image data in a recording medium; and
a second processing circuit including a second CPU and a second communication unit, the second processing circuit acquiring, from the imaging unit, moving image data of a frame that is different from a frame acquired by the first processing circuit, and recording the acquired moving image data in the recording medium, wherein the first CPU causes the first communication unit to transmit, to the second CPU, information of a data amount of moving image data processed by the first processing circuit, wherein the second CPU determines a recording position at which the first processing circuit is to record moving image data in the recording medium based on the information of the data amount received from the first communication unit, and causes the second communication unit to transmit information of the recording position to the first processing circuit, wherein the first processing circuit records moving image data in the recording medium in accordance with the information of the recording position transmitted from the second processing circuit, and wherein the second CPU waits to record moving image data of a frame to be recorded by the second processing circuit until the second CPU receives, from the first processing circuit, information of a data amount of a frame that is to be recorded by the first processing circuit and that precedes the frame to be recorded by the second processing circuit.

* * * * *